(12) United States Patent
Dooley

(10) Patent No.: US 7,944,187 B2
(45) Date of Patent: May 17, 2011

(54) MODULATION CONTROL OF POWER GENERATION SYSTEM

(75) Inventor: Kevin Allan Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 12/504,341

(22) Filed: Jul. 16, 2009

(65) Prior Publication Data

US 2010/0072959 A1   Mar. 25, 2010

Related U.S. Application Data

(60) Continuation of application No. 12/211,327, filed on Sep. 16, 2008, now Pat. No. 7,579,812, which is a division of application No. 11/533,548, filed on Sep. 20, 2006, now Pat. No. 7,439,713.

(51) Int. Cl.
*H02P 9/14* (2006.01)
*H02P 11/00* (2006.01)
*H02P 9/00* (2006.01)
*H02H 7/06* (2006.01)

(52) U.S. Cl. ............... 322/46; 322/22; 322/28; 310/54; 310/201; 310/207

(58) Field of Classification Search ............ 322/22, 322/28, 46; 310/54, 201, 207
See application file for complete search history.

(56) References Cited

U.S. PATENT DOCUMENTS

| | | | |
|---|---|---|---|
| 2,504,768 A | 4/1950 | Watson et al. | 290/4 A |
| 2,564,320 A * | 8/1951 | Brainard | 322/28 |
| 2,692,954 A * | 10/1954 | Young | 307/106 |
| 2,886,762 A | 5/1959 | Polasek | 322/24 |
| 2,894,149 A | 7/1959 | Dortort | 307/57 |
| 3,068,393 A * | 12/1962 | Blackburn | 322/28 |
| 3,258,684 A * | 6/1966 | Geyger | 324/239 |
| 3,294,976 A | 12/1966 | Tipton et al. | 307/57 |
| 3,303,349 A | 2/1967 | Sinclair et al. | 307/58 |
| 3,671,788 A | 6/1972 | Knudson et al. | 310/156.55 |
| 3,678,352 A | 7/1972 | Bedford | 318/400.41 |
| 3,710,226 A | 1/1973 | Seike | 320/123 |
| 3,768,002 A | 10/1973 | Drexler et al. | 322/25 |
| 3,860,883 A | 1/1975 | Bernin | 330/279 |
| 4,039,910 A | 8/1977 | Chirgwin | 318/807 |
| 4,156,836 A | 5/1979 | Wiley | 320/123 |
| 4,239,978 A | 12/1980 | Kofink | 307/16 |
| 4,336,485 A | 6/1982 | Stroud | 320/126 |

(Continued)

FOREIGN PATENT DOCUMENTS

CA   2051626 A1   8/1991

(Continued)

OTHER PUBLICATIONS

European Search Report, EP07253722, Dec. 21, 2007.

(Continued)

*Primary Examiner* — Pedro J. Cuevas

(74) *Attorney, Agent, or Firm* — Ogilvy Renault LLP

(57) ABSTRACT

Methods and apparatuses are disclosed for producing current with a desired output frequency from one or more fixed or variable speed alternators by varying a saturation level of a portion of the alternator(s) based on a output frequency desired, and preferably then rectifying the output to produce a desired electrical output which may be provided as direct current or alternating current to a suitable load.

30 Claims, 15 Drawing Sheets

U.S. PATENT DOCUMENTS

| | | | |
|---|---|---|---|
| 4,347,473 A | 8/1982 | Stroud | 320/126 |
| 4,441,068 A * | 4/1984 | Smith | 323/351 |
| 4,454,464 A | 6/1984 | Stroud | 322/28 |
| 4,489,265 A | 12/1984 | Kuznetsov | 318/773 |
| 4,492,902 A | 1/1985 | Ficken et al. | 318/400.04 |
| 4,539,515 A | 9/1985 | Morishita et al. | 320/123 |
| 4,559,487 A | 12/1985 | Sims et al. | 322/24 |
| 4,604,565 A | 8/1986 | Yokota et al. | 320/123 |
| 4,654,551 A | 3/1987 | Farr | 310/112 |
| 4,704,571 A * | 11/1987 | Rosenberg | 322/29 |
| 4,757,249 A | 7/1988 | Farber et al. | 320/126 |
| 4,766,362 A | 8/1988 | Sadvary | 322/50 |
| 4,788,486 A | 11/1988 | Mashino et al. | 320/123 |
| 4,808,868 A * | 2/1989 | Roberts | 310/68 R |
| 4,827,393 A | 5/1989 | Clark | 363/79 |
| 4,829,228 A | 5/1989 | Buetemeister | 322/27 |
| 4,887,020 A | 12/1989 | Graham | 322/63 |
| 4,959,573 A * | 9/1990 | Roberts | 310/68 R |
| 5,030,877 A | 7/1991 | Denk | 290/52 |
| 5,097,165 A | 3/1992 | Mashino et al. | 310/112 |
| 5,111,095 A * | 5/1992 | Hendershot | 310/168 |
| 5,231,324 A | 7/1993 | Kawamura et al. | 310/198 |
| 5,233,229 A | 8/1993 | Kohl et al. | 307/10.1 |
| 5,254,936 A | 10/1993 | Leaf et al. | 322/90 |
| 5,304,883 A | 4/1994 | Denk | 310/180 |
| 5,397,975 A | 3/1995 | Syverson | 322/46 |
| 5,424,599 A | 6/1995 | Stroud | 310/198 |
| 5,444,355 A | 8/1995 | Kaneyuki et al. | 322/58 |
| 5,502,368 A | 3/1996 | Syverson et al. | 322/28 |
| 5,585,711 A * | 12/1996 | Kemner et al. | 322/46 |
| 5,631,544 A | 5/1997 | Syverson et al. | 322/46 |
| 5,693,995 A | 12/1997 | Syverson | 310/114 |
| 5,710,471 A | 1/1998 | Syverson et al. | 310/114 |
| 5,714,823 A | 2/1998 | Shervington et al. | 310/184 |
| 5,723,972 A | 3/1998 | Bartol et al. | 322/15 |
| 5,731,688 A | 3/1998 | Thomson | 322/22 |
| 5,734,255 A | 3/1998 | Thompson et al. | 322/7 |
| 5,739,676 A | 4/1998 | Judge et al. | 322/22 |
| 5,747,909 A | 5/1998 | Syverson et al. | 310/156.56 |
| 5,753,989 A | 5/1998 | Syverson et al. | 310/114 |
| 5,754,033 A | 5/1998 | Thomson | 322/45 |
| 5,874,797 A | 2/1999 | Pinkerton | 310/156.25 |
| 5,903,116 A | 5/1999 | Geis et al. | 318/140 |
| 5,925,999 A | 7/1999 | Lakerdas et al. | 318/496 |
| 5,930,105 A | 7/1999 | Pitel et al. | 361/212 |
| 5,942,818 A | 8/1999 | Satoh et al. | 310/46 |
| 5,953,491 A | 9/1999 | Sears et al. | 388/811 |
| 5,955,809 A | 9/1999 | Shah | 310/198 |
| 5,973,481 A | 10/1999 | Thompson et al. | 322/7 |
| 6,031,294 A | 2/2000 | Geis et al. | 290/52 |
| 6,218,813 B1 | 4/2001 | Davis | 322/20 |
| 6,232,681 B1 * | 5/2001 | Johnston et al. | 310/44 |
| 6,252,751 B1 | 6/2001 | Rozman | 361/23 |
| 6,265,786 B1 | 7/2001 | Bosley et al. | 290/52 |
| 6,281,664 B1 | 8/2001 | Nakamura et al. | 322/22 |
| 6,297,977 B1 | 10/2001 | Huggett et al. | 363/65 |
| 6,323,625 B1 | 11/2001 | Bhargava | 322/32 |
| 6,325,142 B1 | 12/2001 | Bosley et al. | 166/53 |
| 6,326,713 B1 | 12/2001 | Judson | 310/207 |
| 6,356,471 B1 | 3/2002 | Fang | 363/65 |
| 6,369,549 B1 | 4/2002 | Brefeld et al. | 322/11 |
| 6,373,164 B1 | 4/2002 | Nishimura | 310/207 |
| 6,429,615 B2 | 8/2002 | Schmider et al. | 318/400.01 |
| 6,437,529 B1 | 8/2002 | Brown | 318/400.26 |
| 6,487,096 B1 | 11/2002 | Gilbreth et al. | 363/53 |
| 6,504,261 B2 | 1/2003 | Fogarty et al. | 290/52 |
| 6,515,393 B2 | 2/2003 | Asao et al. | 310/184 |
| 6,583,995 B2 | 6/2003 | Kalman et al. | 363/35 |
| 6,717,318 B1 | 4/2004 | Mathiassen | 310/216.004 |
| 6,781,331 B2 | 8/2004 | Mokri et al. | 318/157 |
| 6,784,656 B2 | 8/2004 | Breinlinger | 324/158.1 |
| 6,809,437 B2 | 10/2004 | Oohashi et al. | 310/45 |
| 6,838,860 B2 | 1/2005 | Huggett et al. | 322/46 |
| 6,839,249 B2 | 1/2005 | Kalman et al. | 363/35 |
| 6,856,053 B2 * | 2/2005 | LeFlem et al. | 310/54 |
| 6,870,279 B2 | 3/2005 | Gilbreth et al. | 290/52 |
| 6,882,067 B2 | 4/2005 | Higashino et al. | 310/51 |
| 6,936,948 B2 | 8/2005 | Bell et al. | 310/201 |
| 6,965,183 B2 | 11/2005 | Dooley | 310/201 |
| 6,995,993 B2 | 2/2006 | Sarlioglu et al. | 363/44 |
| 7,002,317 B2 | 2/2006 | Ganev | 318/701 |
| 7,007,179 B2 | 2/2006 | Mares et al. | 713/310 |
| 7,019,495 B2 | 3/2006 | Patterson | 322/7 |
| 7,061,149 B2 | 6/2006 | Crane | 310/71 |
| 7,119,467 B2 | 10/2006 | Dooley | 310/100 |
| 7,170,211 B2 | 1/2007 | Chen et al. | 310/207 |
| 7,211,919 B2 * | 5/2007 | Kalsi et a | 310/216.113 |
| 7,262,539 B2 | 8/2007 | Dooley | 310/184 |
| 7,288,923 B1 | 10/2007 | Dooley et al. | 322/89 |
| 7,312,550 B2 | 12/2007 | Dooley | 310/201 |
| 7,327,123 B2 * | 2/2008 | Faberman et al. | 322/37 |
| 7,335,998 B2 | 2/2008 | Wolf | 290/10 |
| 7,423,356 B2 * | 9/2008 | Kalsi et al. | 310/52 |
| 7,439,713 B2 | 10/2008 | Dooley | 322/22 |
| 7,443,642 B2 * | 10/2008 | Dooley | 361/23 |
| 7,579,812 B2 * | 8/2009 | Dooley | 322/46 |
| 7,589,441 B2 * | 9/2009 | Kalsi et al. | 310/54 |
| 7,701,678 B2 * | 4/2010 | Dooley | 361/23 |
| 2002/0033646 A1 | 3/2002 | Tanaka et al. | 310/71 |
| 2002/0047455 A1 | 4/2002 | Dhyanchand et al. | 310/211 |
| 2002/0084705 A1 | 7/2002 | Kawamura | 310/68 R |
| 2002/0180284 A1 * | 12/2002 | LeFlem et al. | 310/54 |
| 2002/0190695 A1 | 12/2002 | Wall et al. | 322/17 |
| 2002/0198648 A1 | 12/2002 | Gilbreth et al. | 701/100 |
| 2003/0178896 A1 | 9/2003 | Crane | 310/68 R |
| 2004/0021391 A1 * | 2/2004 | Jones et al. | 310/208 |
| 2004/0183392 A1 | 9/2004 | Dooley | 310/100 |
| 2004/0239202 A1 | 12/2004 | Dooley | 310/184 |
| 2004/0239203 A1 | 12/2004 | Bell et al. | 310/184 |
| 2005/0046396 A1 | 3/2005 | Patterson | 322/28 |
| 2005/0146307 A1 | 7/2005 | Dooley et al. | 322/28 |
| 2005/0212466 A1 | 9/2005 | Rozman et al. | 318/98 |
| 2005/0242785 A1 | 11/2005 | Dooley | 322/44 |
| 2006/0061213 A1 | 3/2006 | Michalko | 307/9.1 |
| 2006/0108882 A1 | 5/2006 | Michalko | 310/83 |
| 2006/0113967 A1 | 6/2006 | Dooley | 322/57 |
| 2006/0226721 A1 | 10/2006 | Dooley et al. | 310/113 |
| 2006/0244332 A1 | 11/2006 | Wyremba | 310/179 |
| 2007/0200440 A1 * | 8/2007 | Kalsi et al. | 310/54 |
| 2007/0247120 A1 | 10/2007 | Dooley et al. | 322/89 |
| 2007/0262662 A1 | 11/2007 | Dooley et al. | 310/54 |
| 2007/0267925 A1 | 11/2007 | Dooley | 310/54 |
| 2007/0267931 A1 | 11/2007 | Dooley et al. | 310/180 |
| 2007/0268023 A1 | 11/2007 | Dooley | 324/546 |
| 2008/0019062 A1 | 1/2008 | Dooley | 361/23 |
| 2008/0067982 A1 | 3/2008 | Dooley | 322/22 |
| 2008/0278020 A1 | 11/2008 | Ley et al. | 310/156.36 |
| 2009/0008936 A1 | 1/2009 | Dooley | 290/7 |
| 2009/0091282 A1 | 4/2009 | Dooley | 318/493 |
| 2009/0167255 A1 * | 7/2009 | Rozman et al. | 322/25 |
| 2010/0019605 A1 * | 1/2010 | Dooley et al. | 310/180 |
| 2010/0072959 A1 * | 3/2010 | Dooley | 322/90 |

FOREIGN PATENT DOCUMENTS

| | | |
|---|---|---|
| DE | 3430590 | 2/1986 |
| EP | 1648096 A1 | 4/2006 |
| EP | 1764908 A1 | 3/2007 |
| GB | 1384156 | 2/1975 |
| JP | 55-61265 | 5/1980 |
| JP | 61251481 | 11/1986 |
| JP | 2000-341991 | 12/2000 |
| WO | 03028202 A1 | 4/2003 |
| WO | 2004068674 A2 | 8/2004 |
| WO | 2004068674 A3 | 8/2004 |
| WO | 2005010630 A1 | 2/2005 |
| WO | 2005025044 A1 | 3/2005 |

OTHER PUBLICATIONS

International Search Report, PCT/CA2007/001585, Dec. 27, 2007.

* cited by examiner

MODULATION CONTROL OF POWER GENERATION SYSTEM

CROSS-RELATED APPLICATIONS

The present application is a continuation of co-pending U.S. patent application Ser. No. 12/211,327, filed 16 Sep. 2008 and entitled MODULATION CONTROL OF POWER GENERATION SYSTEM, which application is a divisional of U.S. patent application Ser. No. 11/533,548, filed Sep. 20, 2006, and now U.S. Pat. No. 7,439,713. The entire contents of each such application is incorporated herein by this reference.

TECHNICAL FIELD

The invention relates generally to electrical power generation, and in particular to electrical power generators & associated systems.

BACKGROUND OF THE ART

The output voltage and frequency of permanent magnet (PM) alternators are typically dependent on alternator rotor speed, which present challenges in power conditioning where rotor speed cannot be independently controlled, such as in alternators driven by prime-movers such as aircraft, ship, vehicle or power generation engines, especially where a specified fixed voltage & frequency alternator output is desired despite the variable speed operation of the prime mover. Limited cost-effective and efficient means exist for conditioning high power electricity. Existing electronic commutation systems are bulky and expensive. The applicant's U.S. Pat. No. 6,965,183, entitled "Architecture for Electric Machine", and co-pending U.S. patent application Ser. Nos. 10/996,411 and 11/420,614, each entitled "Saturation Control Of Electric Machine", present novel architectures and methods, although room for further improvement to the arts of generating and regulating electricity naturally exists.

SUMMARY OF THE INVENTION

It is therefore an object of this invention to provide improved techniques and apparatuses for generating and regulating electricity.

In one aspect, the present invention provides an apparatus comprising a first alternator and a second alternator, each alternator having a rotor and stator, the stator having a plurality of rotor magnetic circuits co-operatively defined between the stator and rotor and a plurality of secondary magnetic circuits, each rotor magnetic circuit encircling a first portion of at least one power winding of the stator, each secondary magnetic circuit encircling a second portion of the power winding disposed outside the rotor magnetic circuits, at least one control winding associated with said secondary magnetic circuits such that a saturating control current through the control winding magnetically saturates at least a portion of said secondary magnetic circuits distinct from the rotor magnetic circuits, the secondary magnetic circuits being paired such that in one secondary magnetic circuit the associated control winding and stator winding second portion are wound around the stator in a same direction while in the other secondary magnetic circuit the associated control winding and stator winding second portion are wound around the stator in opposite directions; a controlled current source assembly connected to said at least one control winding of each alternator and adapted to provide a periodic DC control current flow thereto, the DC current flow having a maximum amplitude above a saturation level required to saturate said portions of said secondary magnetic circuits; a first rectifier for converting alternating current from the at least one power winding of said first alternator to a direct current; a second rectifier for converting alternating current from the at least one power winding of said second alternator direct current; and a combiner circuit for combining direct current from said rectifiers into an alternating current output.

In another aspect, the present invention provides an apparatus comprising at least one alternator drivingly connected to a prime mover to produce an alternator alternating current, the alternator having a rotor, a stator assembly and a saturation apparatus, the stator assembly having at least one stator winding for providing said alternator alternating current, the stator winding having at least a pair of legs serially connected with one another, the legs spaced apart circumferentially from one another relative to the stator assembly, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least a pair of secondary magnetic circuits for conducting magnetic flux, one of the secondary magnetic circuits encircling a second portion of one of said legs of the stator winding and another one of the secondary magnetic circuits encircling a second portion of the other of said legs of the stator winding, the secondary magnetic circuits being remote from the rotor magnetic circuits, the saturation apparatus associated with at least a portion of each secondary magnetic circuit, said at least a portion of each secondary magnetic circuit being remote from the rotor magnetic circuits, the saturation apparatus adapted to selectively magnetically saturate said portion of each secondary magnetic circuit at a selected frequency, the saturation apparatus adapted to magnetically saturate one of the secondary magnetic circuits in the same direction as magnetic flux circulating that secondary magnetic circuit while magnetically saturating another one of secondary magnetic circuits in the direction opposite to magnetic flux circulating that secondary magnetic circuit; AC-to-DC conversion circuitry connected to the stator winding adapted to convert the alternator alternating current into direct current; and DC-to-AC conversion circuitry connected to the AC-to-DC conversion circuitry and adapted to convert the direct current into an alternating current output having an output frequency proportional to the selected frequency.

In another aspect, the present invention provides an apparatus comprising at least one alternator drivingly connected to a prime mover to produce an alternator alternating current, the alternator having a rotor and a stator assembly having at least one stator winding for providing said alternator alternating current, the stator winding having at least a pair of legs serially connected with one another, the legs spaced apart circumferentially from one another relative to the stator assembly, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least a pair secondary magnetic circuits for conducting magnetic flux, one of said secondary magnetic circuits encircling a second portion of one of said legs of the stator winding and the other one of said secondary magnetic circuits encircling a second portion of the other of said legs of the stator winding, the secondary magnetic circuits being remote from the rotor magnetic circuits, the secondary magnetic circuits having a saturation apparatus including at least one control winding wound around at least a portion of the secondary magnetic circuits, said at least a portion of the secondary magnetic circuits being remote from the rotor magnetic circuits, the control winding adapted to magnetically saturate said portion of the secondary magnetic circuits when a saturation threshold current passes through the control winding, wherein one of the secondary magnetic circuits has its control winding wound in a same direction as the second portion of the stator winding leg associated therewith, and wherein the other one of the secondary magnetic circuits has its control winding wound in an opposite direction relative to the second portion of the stator winding leg associated therewith; a controlled current source for providing to the control winding a variable amplitude current having a selected frequency and a maximum amplitude of at least said saturation threshold current; AC-to-DC conversion circuitry connected to the stator winding and adapted to convert the alternator alternating current into direct current; and DC-to-AC conversion circuitry connected to the AC-to-DC conversion circuitry and adapted to convert the direct current into an alternating current output having an output frequency proportional to the selected frequency.

In another aspect, the present invention provides an apparatus comprising an alternator having a rotor, a stator assembly and a saturation apparatus, the stator assembly having at least one stator winding, the winding having at least a pair of legs serially connected with one another, the legs spaced apart circumferentially from one another relative to the stator, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least two secondary magnetic circuits for conducting magnetic flux, one of the secondary magnetic circuits encircling a second portion of one of said legs of the stator winding and another one of the secondary magnetic circuits encircling a second portion of the other of said legs of the stator winding, the secondary magnetic circuits being remote from the rotor magnetic circuits, the saturation apparatus adapted to magnetically saturate at least a portion of each secondary magnetic circuit, said at least a portion of each secondary magnetic circuit being remote from the rotor magnetic circuits, the saturation apparatus adapted to magnetically saturate one of the secondary magnetic circuits in the same direction as magnetic flux circulating that secondary magnetic circuit while magnetically saturating the other one of secondary magnetic circuits in the direction opposite to magnetic flux circulating that secondary magnetic circuit; and a rectifier arranged to convert alternating current from the stator winding into direct current.

In another aspect, the present invention provides an apparatus for a generating alternating current comprising at least one alternator having a stator with at least one stator winding, the stator defining at least two rotor magnetic circuits and at least two secondary magnetic circuits separate from the rotor and the rotor magnetic circuits, the stator winding having first portions thereof encircled only by the rotor magnetic circuits and second portions thereof encircled only by the secondary magnetic circuits; means for magnetically saturating at least a portion of respective pairs of secondary magnetic circuits in opposite relative directions to thereby regulate alternator output while leaving the rotor magnetic circuits un-saturated; a control apparatus adapted to control said means to selectively control a saturation level according to a selected pattern; a rectifier to convert alternating current from the stator winding into a direct current; and an inverter for converting direct current from the rectifier into alternating current output having an output pattern proportional to said selected pattern.

In another aspect, the present invention provides a method of producing alternating current in a power generating system having at least first and a second alternators each having a stator comprising at least one power winding and at least one control winding, each power winding having a plurality of first portions associated with a plurality of rotor magnetic circuits and a plurality of second portions associated with a plurality of secondary magnetic circuits isolated from the rotor magnetic circuits, each control winding wound around at least a portion of each secondary magnetic circuit, said portion of each secondary magnetic circuit being remote from the rotor magnetic circuits, wherein for each secondary magnetic circuit which has its control winding wound in a same direction as the second portion of the stator winding associated therewith there is another secondary magnetic circuit which as has its control winding wound in an opposite direction relative to the second portion of the stator winding associated therewith, said method comprising the steps of driving said first and said second alternators to induce alternating current flow in said power windings; varying in amplitude a control current flow in said control windings of each alternator according to a selected pattern, at least a portion of said selected pattern having a sufficient current amplitude to magnetically saturate said portions of the secondary magnetic circuits to thereby control an amplitude of said induced alternating current flow in the power windings; converting current flow from the power windings of each alternator into a direct current; and combining said direct currents of each alternator to provide an alternating current output having a pattern proportional to the selected pattern.

In another aspect, the present invention provides a method for providing alternating current, the method comprising the steps of connecting an alternator to a load system, the alternator having a rotor and a stator assembly with at least one stator winding, the stator winding having at least a pair of serially-connected legs spaced apart circumferentially from one another relative to the stator assembly, the legs each having respective first and second portions; rotating the rotor relative to stator assembly to circulate rotor magnetic flux through the stator along respective first magnetic paths around each of said first portions said legs of the stator winding to induce an alternating current flow in the stator winding, said induced current in the stator winding inducing a secondary magnetic flux flow in the stator assembly in respective second magnetic paths around each of said second portions of said legs of the stator winding, the second magnetic paths defined wholly within the stator assembly and separately from the first magnetic path; magnetically saturating and de-saturating at a desired frequency at least two portions of the stator assembly remote from the first magnetic path, said stator assembly portions comprising at least a portion of a corresponding one of said second magnetic paths and thereby conducting a said secondary magnetic flux flow therethrough, wherein one of said at least two stator assembly portions is instantaneously saturated in a same direction as secondary magnetic flux flow therethrough while the other one of said stator assembly portions is instantaneously saturated in an direction opposite to secondary magnetic flux flow therethrough; rectifying the induced alternating current into direct current, the direct current having a cyclical component with a frequency proportional to said desired frequency; and changing the direct current into an alternating current output having a frequency proportional to said desired frequency.

In another aspect, the present invention provides a method of generating alternating current output comprising the steps of driving an alternator to produce electricity corresponding to a positive half of an output AC cycle; driving a second alternator to produce electricity corresponding to a negative half of the output AC cycle; rectifying the respective alternator outputs; and summing the alternator outputs to provide the alternating current output.

Further details of these and other aspects will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
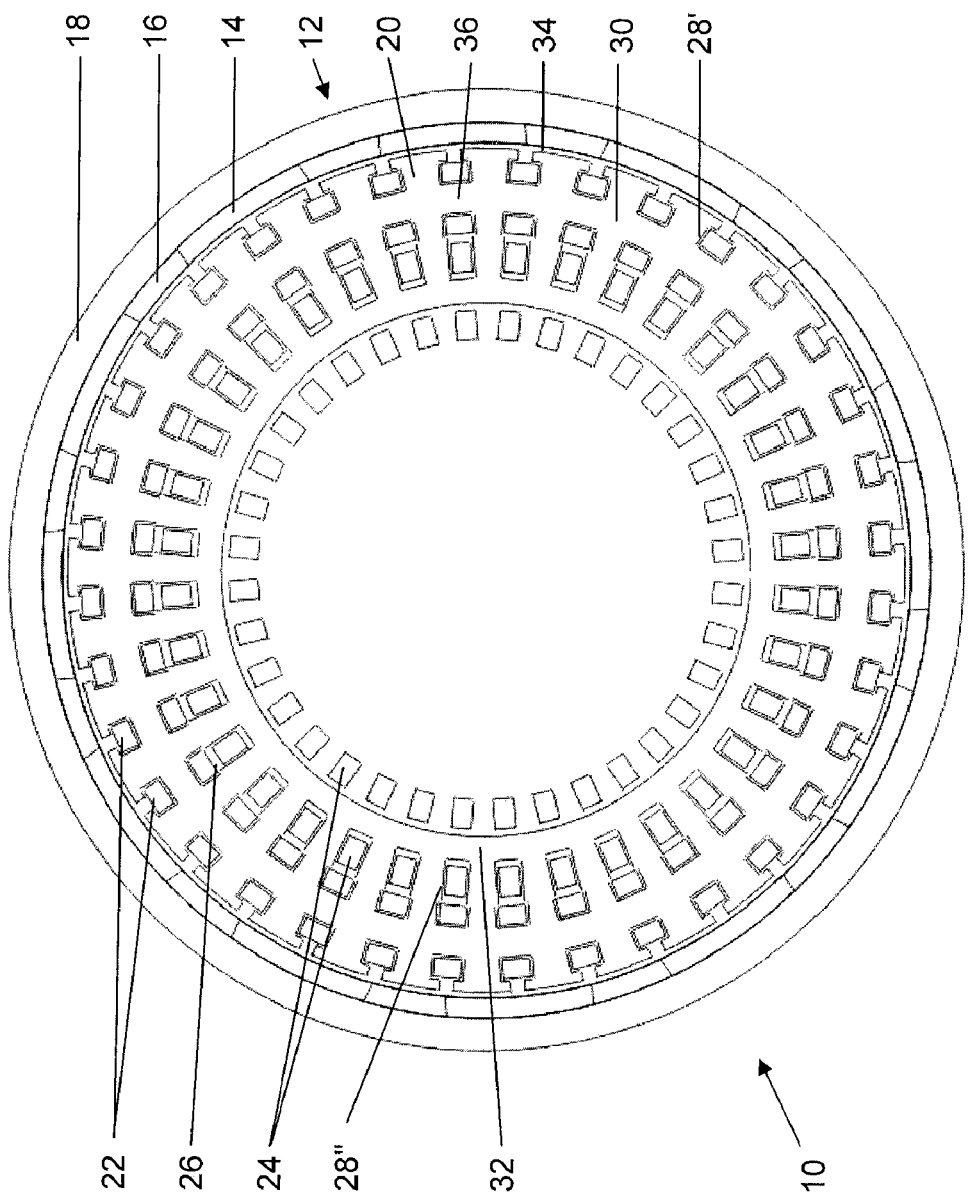
FIG. 1 is a cross-section of a permanent magnet alternator.
Figure 2:
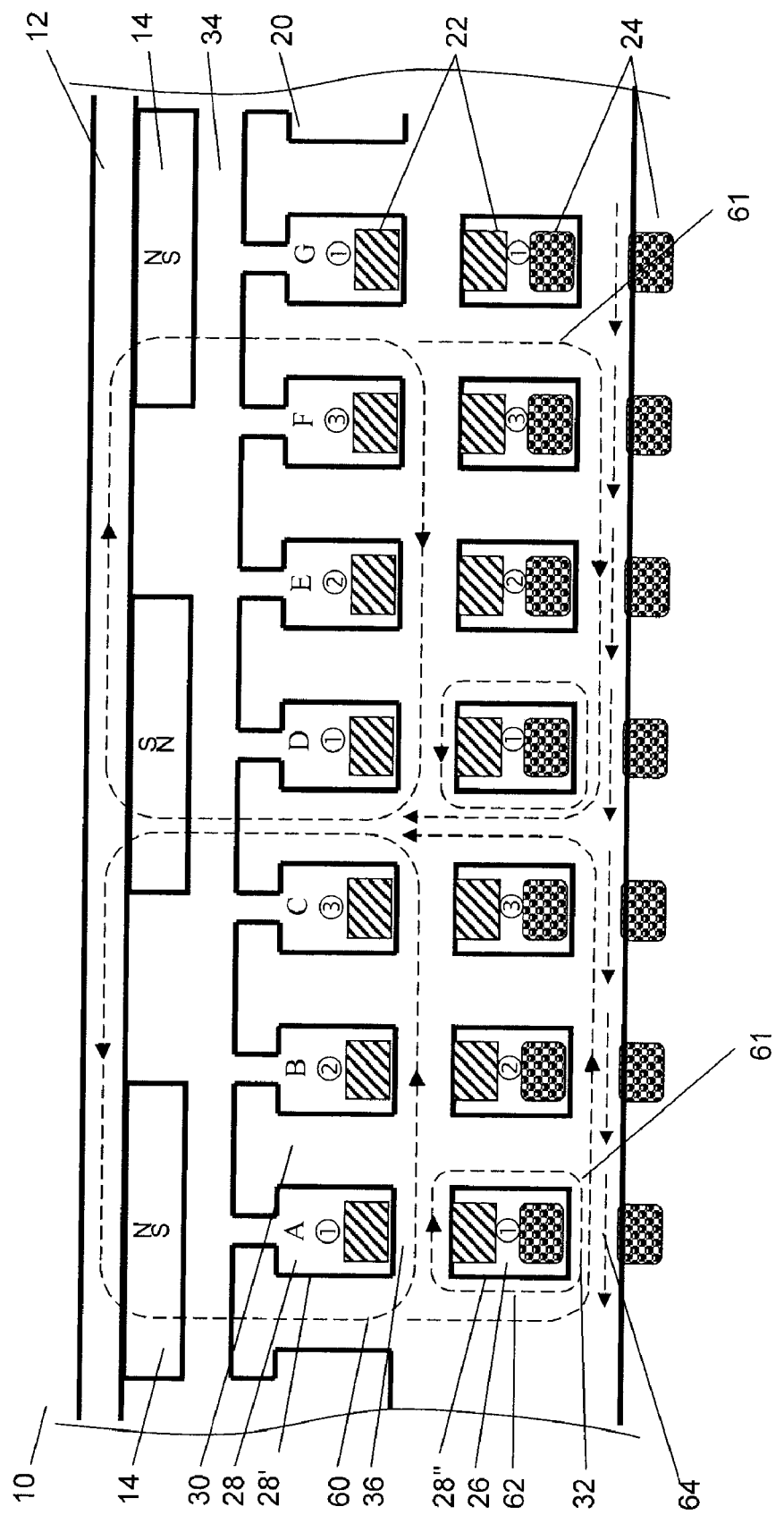
FIG. 2 is a partial schematic of the alternator of FIG. 1.

Referring first to FIGS. 1 and 2, a permanent magnet (PM) electric machine 10 is depicted. For ease of illustration and description, FIG. 2 shows a linear arrangement of the electric machine 10 of FIG. 1. However, it is to be understood that the machine 10 is generally preferred to have the circular architecture of FIG. 1, with an inside or outside rotor (FIG. 1 shows an outside rotor). It will also be understood by the skilled reader that FIGS. 1 and 2, as well as the accompanying description, are schematic in nature, and that routine details of machine design may have occasionally been omitted for clarity, as will be apparent to the skilled reader. The machine 10 may be configured as an alternator to generate electrical power, a motor to convert electrical power into mechanical torque, or both. The alternator aspects of such a machine are primarily of interest in the following description.

The machine 10 has a rotor 12 with permanent magnets 14, optionally interposed by spacers 16, which rotor 12 is mounted for rotation relative to a stator 20. A retention sleeve 18 is provided to hold the permanent magnets 14 and the spacers 16. It also provides the magnetic path between the magnets 14. Stator 20 has at least one power winding 22 and preferably at least one control winding 24. In the illustrated embodiment, the stator 20 has a 3-phase design with three essentially independent power windings 22 (the phases are denoted by the circled numerals 1, 2, 3, respectively in FIG. 2) and, correspondingly, three control windings 24. The power windings in this embodiment are star-connected, although they may be delta-connected, or even unconnected, if desired. The power windings 22 and control windings 24 are separated in this embodiment by a winding air gap 26 and are disposed in radial phase slots 28, divided into slot portions 28' and 28", provided in the stator 20 between adjacent teeth 30. For ease of description, the adjacent phase slots 28 are indicated in FIG. 2 as A, B, C, D, etc., to indicate adjacent phase slots 28. The power windings 22 are electrically insulated from the control windings 24. A back iron 32, also referred to as the control flux bus 32 in this application, extends between and at the bottom of the slots 28 (i.e. below the bottoms of adjacent slot portions 28" in FIG. 2). A rotor air gap 34 separates rotor 12 and stator 20 in a typical fashion. A core or "bridge" portion, also referred to as the "power flux bus" 36 portion of stator 20 extends between adjacent pairs of teeth 30 in slot 28 to form the two distinct slots 28' and 28". The first slots 28' hold the power windings 22 only, and the second slots 28" hold both the power windings 22 and control windings 24 adjacent one another.

The materials for the PM machine 10 may be any deemed suitable by the designer. Materials preferred by the inventor are samarium cobalt permanent magnets, copper power and control windings, a suitable saturable electromagnetic material(s) for the stator teeth and power and control flux buses, such as Hiperco 50 alloy (a trademark of Carpenter Technology Corporation) is preferred, although other suitable materials, such as electrical silicon steels commonly used in the construction of electromagnetic machines, may also be used. The stator teeth, power and control flux buses may be integral or non-integral with one another, as desired.

Figure 3:
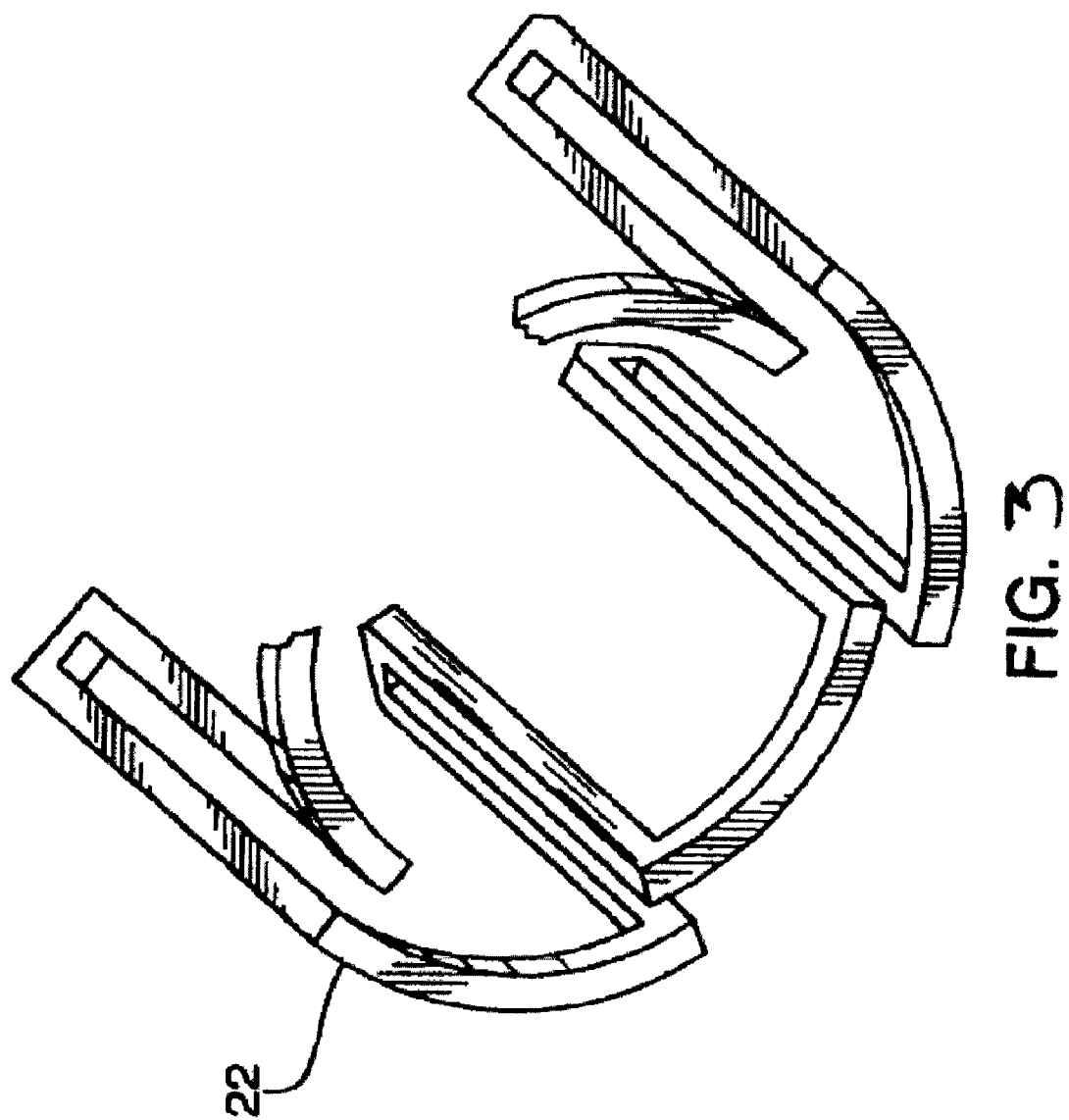
FIG. 3 is a sample power winding of the machine of FIGS. 1 and 2.

FIG. 3 shows an example of one of the power windings 22, positioned as it would be wound in the stator in a 3-phase configuration. Each of the power windings 22 in this embodiment consists of a single turn conductor which enters, for instance, the first slot portion 28' of a selected slot 28 (e.g. at slot "A" in FIG. 2), extends through the slot and exits the opposite end of the slot, and then radially crosses the power flux bus 36 to enter the second slot portion 28" of the same slot 28 (e.g. at slot "A"), after which it extends back through the length of the selected slot, to exit the second slot portion 28", and hence exits the slot 28 on the same axial side of the stator as it entered. The conductor of power winding 22 then proceeds to the second slot 28" of the next selected slot 28 (e.g. slot "D" in FIG. 2), where the power winding 22 then enters and passes along the slot 28, exits and radially crosses the power flux bus 36, and then enters the adjacent first slot portion 28' of the selected slot 28, and then travels through the slot again to exit slot 28' and the stator adjacent where the winding entered the slot 28" of the selected slot 28. The power winding then proceeds to the next selected slot 28 (e.g. slot "G"), and so the pattern repeats. A second power winding 22 corresponding to phase 2, begins in an appropriate selected slot (e.g. slot B of FIG. 2) and follows an analogous path, but is preferably wound in an opposite winding direction relative to winding 22 of phase 1. That is, the phase 2 winding 22 would enter the selected slot (slot B) via slot portion 28" (since phase 1 winding 22 entered slot A via slot portion 28', above), and then follows a similar but opposite path to the conductor of phase 1, from slot to slot (e.g. slots B, E, etc.).

Similarly, the phase 3 winding 22 is preferably oppositely-wound relative to phase 2, and thus enters the selected slot (e.g. slot "C") of the stator via slot portion 28', and follows the same general pattern as phase 1, but opposite to the pattern of phase 2, from slot to slot (e.g. slots C, F, etc.). Thus, the phases of the power winding 22 are oppositely-wound relative to one another.

Meanwhile, a control winding(s) 24 is wrapped around the control flux bus 32, in a manner as will now be described. Referring to FIG. 2, in this embodiment, control winding 24 preferably forms loops wrapped preferably multiple times around the control flux bus 32, such as 25 times to provide a 25:1 control-to-power winding turns ratio, for reasons described below. The direction of winding between adjacent second slots 28" is preferably the same from slot to slot, and thus alternatingly opposite relative to the power winding 22 of a same phase wound as described above, so that a substantially net-zero voltage is induced in each control winding 24, as will also be described further below. Preferably, all loops around the control flux bus 32 are in the same direction. Note that the control winding 24 does not necessarily need to be segregated into phases along with the power windings, but rather may simply proceed adjacently from slot to slot (e.g. slots A, B, C, D, etc.). Alternately, though not segregated into phase correspondence with power windings 22, it may be desirable to provide multiple control windings, for example, to reduce inductance and thereby improve response time in certain situations. Preferably, several control windings 24 are provided in a series-parallel arrangement, meaning the control windings 24 of several slots are connected in series, and several such windings are then connected in parallel to provide the complete control winding assembly for the machine. Although it is preferred to alternate winding direction of the power windings, and not alternate direction of the control windings, the power and control windings are preferably wound in even numbers of slots, half in the same direction and half in opposite directions to ensure a substantially net-zero voltage is induced in each control winding 24 as a result of current flow in the power windings 22, so that the function described below is achieved.

The control winding(s) 24 is (are) connected to a current source 50 (see FIG. 4), which in this example includes a variable current direct current (DC) source and an appropriate solid state control system preferably having functionality as described further below. If there is more than one control winding 24, each control winding 24 can be connected to the same current source 50, or connected to a respective one. The approximate current required from such source is defined primarily by the power winding output current required and the turns ratio of the power and control windings, as will be understood by the skilled reader in light of this disclosure.

Figure 4:
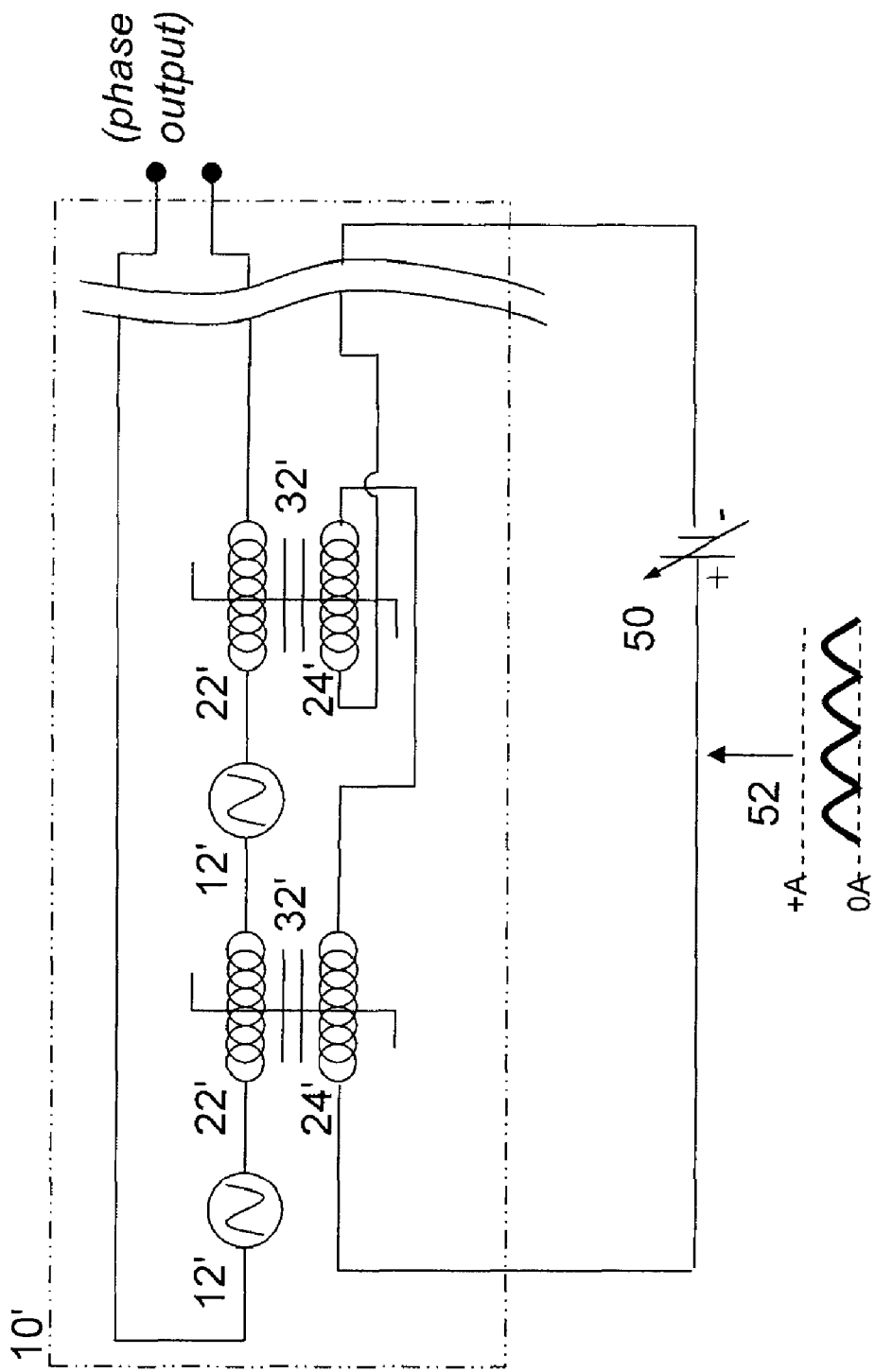
FIG. 4 is a schematic of a partial equivalent circuit of the machine of FIGS. 1 and 2.

Referring to FIG. 4, each phase of the machine 10 can be represented by an approximately equivalent circuit 10' having a plurality of alternating current (AC) voltage sources 12' (i.e. each, equivalent to the moving magnetic rotor system in conjunction with the portion of a power winding 22 located in the first slot 28') connected to a plurality of power inductors 22' (i.e. equivalent to the portion of the power winding 22 located in the second slot 28"), the voltage sources 12' and power inductors 22' arranged alternately in series. Associated with power inductors 22' are a plurality of control inductors 24' (i.e. equivalent to control winding 24) having saturable cores 32' (equivalent to the control flux bus 32). Control inductors 24' are connected to a variable DC current source and control system in this example, represented by 50. Therefore, one can see that the power winding(s) 22, the control winding(s) 24 and the control flux bus 32 co-operate to provide at least a saturable core inductor within the stator 12. The saturable core inductor in conjunction with other electromagnetic effects, described further below, provides an integrated approach to implementing the power regulation schemes described below.

Referring again to FIG. 2, when the machine 10 is used in an alternator mode, rotor 12 is rotated (i.e. by a prime mover) relative to stator 20. The interaction of magnets 14 and the portions of the stator forming a portion of the primary magnetic circuit, creates a primary magnetic flux within PM machine 10 along a primary magnetic flux path or magnetic circuit 60, also referred to herein as the rotor magnetic circuit. The primary or rotor flux induces a voltage in the power winding 22 which, when an electrical load is connected, results in an induced current. The induced current in power winding 22 causes a secondary magnetic flux to circulate an adjacent secondary magnetic flux path or magnetic circuit 62. As the skilled reader will appreciate in light of this disclosure, if there is no current flow in power winding 22, no magnetic flux circulates around the secondary magnetic circuit. As well, magnetic flux, or lack thereof, in the secondary magnetic circuit does not directly affect the flux in the primary magnetic circuit. The secondary AC magnetic circuit 62 is, for the most part, isolated from the rotor 12 and the primary magnetic circuit 60, as the AC flux in secondary magnetic circuit 62 is due only to current flow in the power winding. The secondary magnetic circuit can therefore be said to be defined remotely from the primary magnetic circuit and is provided in this manner so as to be capable of conducting magnetic flux independently of flux in the primary magnetic circuit. It will be noted from FIG. 2, as well, that the primary magnetic circuit encircles a first portion of the power winding 22 (i.e. the portion in slot portion 28'), while the secondary magnetic circuit 62 encircles a second portion of the power winding 22 (i.e. the portion in slot portion 28"), not to mention also a portion of the control winding 24 in this embodiment. Slot portion 28" is outside the primary magnetic circuit 60. It is to be understood that this description applies only to phase "1" of the 3-phase illustrated embodiment, and that similar interactions, etc. occur in respect of the other phases.

The skilled reader will appreciate in light of the above discussion that it may be desirable in many situations to include a regulation apparatus to maintain a minimum current in the power winding during no-load conditions, such as applicant's co-pending application Ser. No. 11/379,620 entitled "Voltage-Limited Electric Machine", filed Apr. 21, 2006, incorporated herein by reference and now briefly described. FIG. 2 shows a dotted magnetic flux path 61, defined in the stator, along which leakage flux from the rotor magnets (referred to herein as primary suppression flux 61 for convenience), flows from a magnet, through teeth 30 and around the tertiary magnetic circuit path 64, causing some of the rotor flux that would otherwise flow along the power bus 36 in primary magnetic circuit path 62 to, instead, be branched down and along the control bus 32 and then back up via the appropriate tooth 30 to the opposite pole magnet. This effect results in voltage being induced in the portion of the power winding 22 disposed in the lower portion 28" of the slot 28, the polarity of which opposes the voltage generated in the portion of the power winding 22 disposed in the upper portion 28' of slot 28. This also reduces the voltage generated in the portion of the power winding 22 disposed in the upper portion 28' of slot 28 because some of the flux that would otherwise pass via the power flux bus 36 is diverted to the control bus 32. These two actions suppress the effective voltage source 12' (as depicted in FIG. 4) when little or no current is present in control winding(s) 24. As current in control winding(s) 24 is increased, less rotor leakage flux passes via the control bus (i.e. along path 61) and the suppressing effect is reduced, resulting in an increase in the voltage generated in the power winding 22.

Referring still to FIG. 2, in this embodiment primary magnetic circuit 60 includes rotor 12, rotor air gap 34, power flux bus 36 and the portion of stator teeth 30 between rotor 12 and power flux bus 36. Primary magnetic circuit 60 encircles a portion of the power winding 22 and, in use as an alternator, magnetic flux from the rotor circulating the primary magnetic circuit 60 causes a current flow in the power winding 22. (As the skilled reader will appreciate, rotation of the rotor causes magnetic flux to circulate the primary magnetic circuit 60, regardless of whether current flows in the power winding 22.) Secondary magnetic circuit 62 includes power flux bus 36, control bus 32 and the portion of stator teeth 30 between control bus 32 and power flux bus 36 in this embodiment. Since the secondary magnetic circuit 62 path is isolated from the primary magnetic circuit 60 path, at no time does rotor magnetic flux circulate around the secondary magnetic circuit 62.

Figure 13:
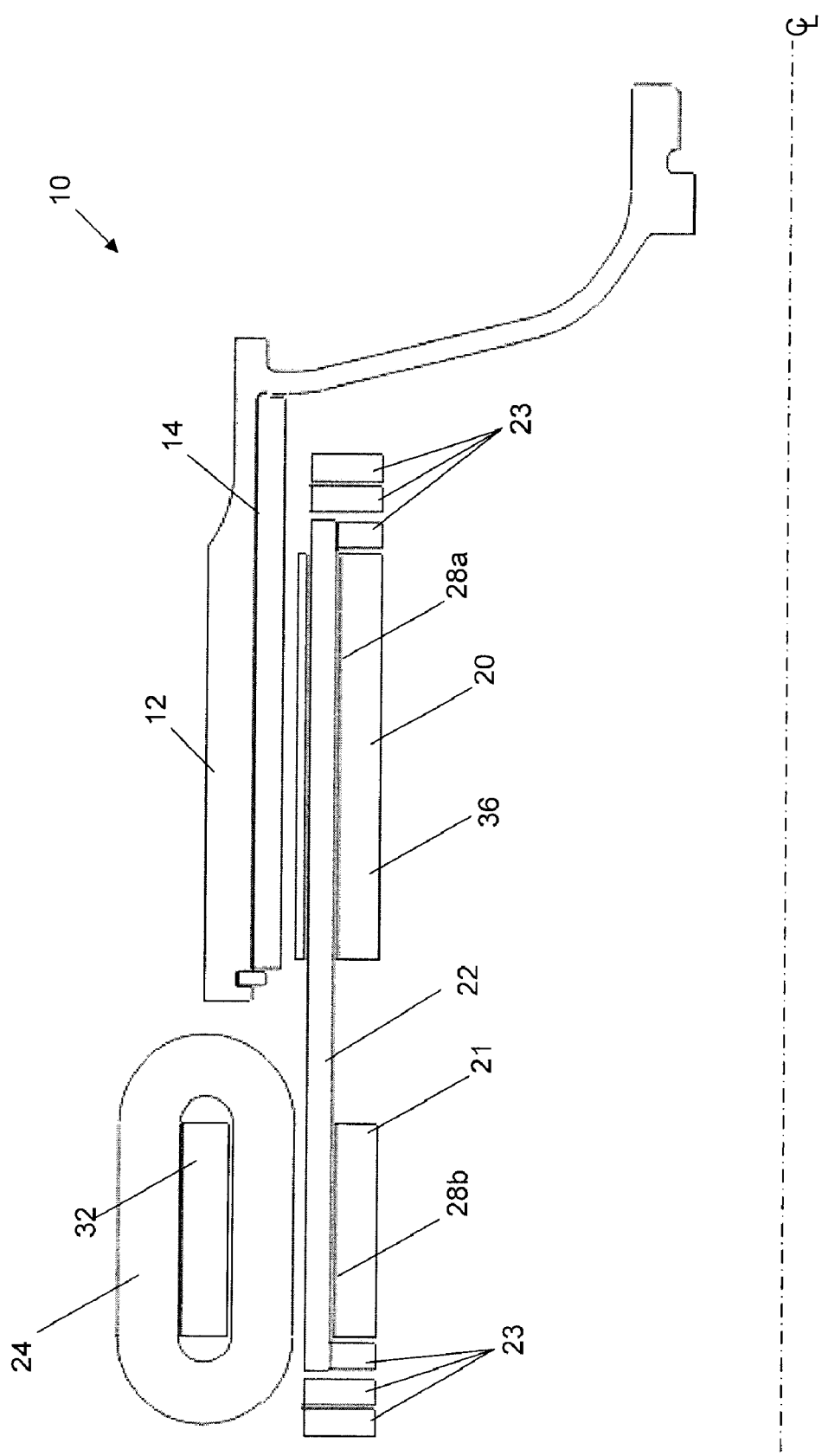
FIG. 13 depicts, in side cross-section, a portion of another alternator configuration.

Referring still to FIG. 2, in this embodiment the secondary magnetic circuit 62 encircles the portions of the power winding 22 and the control winding 24 in the second slot 28". The primary magnetic circuit 60 encircles the first slot 28' while the secondary magnetic circuit 62 encircles the second slot 28". The first slot 28' is preferably radially closer to the rotor 12 than the second slot 28". Power flux bus 36 is preferably common to both the primary and secondary magnetic circuit paths, but need not be so. For example, if desired, the power flux bus may be separate from the upper portion of the secondary flux path along the direction of flux lines so that the secondary magnetic circuit is physically separated from the primary magnetic circuit, as depicted in FIG. 13 (however this will eliminate the no/low-load voltage source suppression action as described above). In the embodiment of FIG. 13, the control winding 24 is located within slots 28b provided in a separate stator 21, which is preferably but not necessarily positioned concentrically with stator 20. While control winding 24 is depicted schematically as a monolithic annulus in FIG. 13, is it preferably a multiple-turns wound conductor, as described above, connected to a suitable power source (not shown in this Figure). Power winding 20 is positioned within slots 28a and 28b, and thus extends between stator 20 and stator 21. Power winding end turns 23 join the conductors of adjacent slots (the embodiment of FIG. 13 has three sets of power windings 22—only one of which is shown—with one winding set corresponding to each phase of a three-phase system, and hence three sets of end turns 23 are depicted in FIG. 13, the innermost set corresponding to the power winding 22 depicted, while the others correspond to adjacent phases which are not depicted). Stator 21 provides control flux bus 32 and the secondary magnetic circuit 62, while power flux bus 36 is provided in stator 20. Power flux bus portion 36 forms part of primary magnetic circuit 60, while stator 21 forms part of secondary magnetic circuit 62. Control flux bus 32 provides a portion of secondary magnetic circuit 62 and tertiary magnetic circuit 64, as before. Stator 21 is supported in any suitable manner, such as through integration with stator 20 (not shown), through supports (not shown) mounted to stator 20 or other suitable foundation, or simply through the intrinsic supported provided by power windings 22 themselves, preferably in conjunction with suitable means (not shown) to impede unwanted vibration, etc. Still other suitable machines configurations are available, a few examples of which are disclosed in Applicant's co-pending application Ser. No. 11/420,614, filed May 26, 2006, incorporated herein by reference.

Referring again to the embodiment of FIG. 2, a tertiary magnetic circuit 64 preferably circulates around control bus 32, as partially indicated in FIG. 2 (i.e. only a portion of the tertiary circuit is shown, as in this embodiment the tertiary circuit circulates through the entire stator 20). The control flux bus 32 is preferably common to both the secondary and tertiary magnetic circuit paths. At least a portion of control flux bus 32 is saturable by the flux density in the tertiary magnetic circuit 64.

When operated as an alternator, the machine 10 permits the output of the power winding(s) 22 to be controlled through a manipulation of current supplied to the control winding(s) 24, as will now be described.

As explained above, the equivalent power inductor 22' is formed by the portion of the power winding 22 in the second slot 28" and the secondary magnetic circuit 62, as schematically represented by the equivalent circuit of FIG. 4. The control winding 24 shares a portion of the secondary magnetic circuit 62, however since it is preferably wound in the same direction around the control flux bus 32 in each second slot 28", as mentioned above, the resulting effect achieved is similar to that provided by alternatingly reversed polarity saturable inductors relative to power winding 22, and there is preferably substantially no net voltage generated within the overall control winding 24 by flux in the secondary magnetic circuit 62 or by primary suppression flux 61 from the rotor magnets.

The application of a DC current from the source 50 to the control winding 24 results in a DC flux circulating circuit 64 in the control flux bus 32. At the instant in time depicted in FIG. 2, it can be seen that the DC flux in tertiary magnetic circuit 64 in the control flux bus 32 is in the same direction in slot A as the AC flux in secondary magnetic circuit 62, but in slot D the direction of the DC flux in tertiary magnetic circuit 64 in the control flux bus 32 is opposite to the AC flux in secondary magnetic circuit 62. As the DC current is increased in the control winding 24, the flux density in the control bus 32 is increased such that the saturation flux density is eventually reached. The machine may be configured, as well, such that virtually any current through the control windings results in saturation of the associated portion of the stator in the absence of power winding current (i.e. no opposing fluxes from the power winding current). It will be understood that saturation is reached first in the regions in the control flux bus 32 where the AC flux and the DC flux are in the same direction, and that at higher DC control currents both regions of the control flux bus 32 become saturated regardless of flux direction, if the current in the power phase winding is not sufficient to prevent saturation in the areas where the flux is in opposite directions. If the current in the power windings is increased above the point where saturation of both regions is achieved, one of the regions will come out of saturation. Once saturation occurs, the AC flux in the secondary magnetic circuit 62 due to the current in the power winding 22 is very significantly reduced. However, as the skilled reader will appreciate from the description herein, saturation does not substantially alter the flux in the primary magnetic circuit 60, but rather only directly influences the flux developed in the secondary magnetic circuit 62. It will be apparent to the skilled reader that saturation of the type described herein preferably does not occur in any portion of the primary magnetic circuit.

As mentioned, the winding pattern of the control winding 24 relative to the power winding 22 preferably results in a near net zero voltage induced in the control winding 24, which simplifies control. In this embodiment, from one slot portion 28" to the next, successive turns of the power winding 22 are wound in opposite relative directions, while the corresponding portions of control winding 24 adjacent the power windings are wound in the same direction. Also, since the DC control current through the control flux bus 32 produces magnetic fluxes in different directions relative to the power winding 22, one section of the control flux bus 32 will saturate more in one half cycle of the AC power (e.g. in a positive direction or polarity) while another section of the control flux bus 32 will saturate more in the other half cycle (e.g. in a negative direction or polarity), thus tending to equalize the control action through each half-cycle.

Once saturated, magnetic materials substantially lose their ability to conduct additional magnetic flux, and as such appear to be almost non-magnetic to both AC magnetic forces ($H_{AC}$) and further changes in DC magnetic influence ($H_{DC}$). The net effect of this saturated condition in the control flux bus 32 is thus to virtually eliminate the inductance due to the secondary magnetic circuit 62, which thereby significantly reduces inductance of the machine 10. This action also reduces leakage flux from the rotor circulating in the control bus (primary suppression flux 61).

Furthermore, as the current flow in the power winding 22 increases, for example due to an increase in the external load or an increase in the generated output voltage due to an increase in operating speed, the portion of the control flux bus 32 in which the flux directions are instantaneously opposing will become less saturated, which causes a proportional increase in the inductance. This effect tends to cause the output current to remain somewhat constant, thus the output current of the alternator becomes a function of the control current. The maximum inductance of the equivalent power inductor 22' formed by the secondary magnetic circuit 62 is related to the physical dimensions and materials of the stator portions carrying the secondary magnetic circuit 62. The peak power winding current is related to the DC current in the control winding and may be approximated by:

$$I_P = K + [I_C * N_C / N_P]$$

where: $N_P$ and $N_C$ are the number of turns in the power and control windings, respectively, $I_P$ and $I_C$ are the currents in the power and control windings, respectively, and K is a constant which is inversely proportional to the maximum inductance of the power winding and other machine design features, as will be appreciated by the skilled reader.

This permits manipulation of the output of power winding 22, and thus control winding 24 may be used as a source of control of PM machine 10. Means for controlling the operation of PM machine 10 are thus available within the machine itself, as the "control" current may be generated by the power windings 22 of the PM machine 10, typically in conjunction with rectifiers. In some instances, an external source of control current may be required or desired, in conjunction with an electronic current control, although arranging the control winding 24 in series with the rectified output current may also be used to regulate output voltage to some extent. The architecture therefore lends itself to many novel possibilities for control systems for the machine 10, a few examples of which will now described.

For example, referring now to FIGS. 2 and 4, the output (i.e. from a power winding 22) of alternator 10 may be controlled by connecting the control winding 24 to a power supply 50, and a current applied to the control winding 24 preferably sufficient to saturate the control flux bus 32 at a desired power winding current, such saturation being caused by magnetic flux flowing along tertiary path 64 induced by current passing though control winding 24, which is wrapped around control flux bus 32 in this embodiment. When saturation occurs, AC flux around the secondary magnetic circuit 62 is effectively eliminated, and the magnetic relationship between the power winding 22 and the secondary magnetic circuit 62 is such that inductance due to the secondary magnetic circuit in the power winding 22 is virtually eliminated. Thus, more current is permitted to flow in the power winding 22 than would flow without the saturating flux developed by the controlled DC current source. This increase in power winding current will be limited at the point where the fluxes in opposing directions become essentially equal in magnitude, resulting in de-saturation of the secondary magnetic circuit portions where this flux equalisation condition occurs at that particular instant. The de-saturation effect results in an abrupt increase in the inductance at the instant corresponding to opposing flux equalisation, which in turn limits the power winding current to the corresponding current value. Therefore, the current level provided by controlled current source supply 50 can be varied, as required, to regulate the output current of the power winding 22 (and thus, ultimately, output voltage) over a range of rotor speeds and electrical loads. In one example application, in order to effect constant output voltage control, a feedback control circuit (discussed further below) is used by the control system of source 50 to compare the alternator output voltage (i.e. the output of power winding 22) to a fixed reference (e.g. representative of a desired output voltage level(s)), and control can be configured such that, when the alternator output voltage is less than a desired reference level, a command is provided to increase the control current to increase saturation level and therefore output current, and thus the output voltage across a given output load. Such control systems are well known and may be implemented using digital or analog approaches. In a second example application, if the current source 50 varies the control current according to a desired pattern, for example such as in a half-sinusoidal pattern 52 as depicted schematically in FIG. 4, and thereby affects saturation level accordingly when the control winding is appropriately configured as described further below, the absolute value of the amplitude of the AC output of the power windings will vary according to the same general pattern and frequency, and thus can be regulated in a useful manner, as will be further discussed below in reference to FIGS. 6-12. The input control pattern may be any desired, and need not be regular or periodic, as will be discussed. Preferably, the input control will have a lower frequency than the raw output frequency of the alternator, although this is not necessary, depending on the output signal or effect desired.

Referring again to FIG. 2, magnetic flux preferably circulates the tertiary magnetic circuit 64 in the same direction around the control flux bus 32. As mentioned above, although the control winding 24 is provided in the second slots 28" corresponding to a particular phase of the 3-phase machine described, the power windings 22 are wound in the opposite direction in each first slot 28' which is due to the opposite polar arrangement of the magnets 14 associated with each adjacent first slot 28' of the phase. To ensure that a uniform direction for the tertiary magnetic circuit 64 is provided, as mentioned, the control windings 24 are preferably wound in the same direction in all second slots 28". Also as mentioned, as a result of this in-phase & out-of-phase or relationship between the corresponding portions of the power and control windings as described above, a near net-zero voltage is induced in the control winding 24, which is desirable because a relatively low DC potential may be used to provide DC control currents, and no special considerations are required to remove a significant AC potential on the control winding 24.

Figure 5:
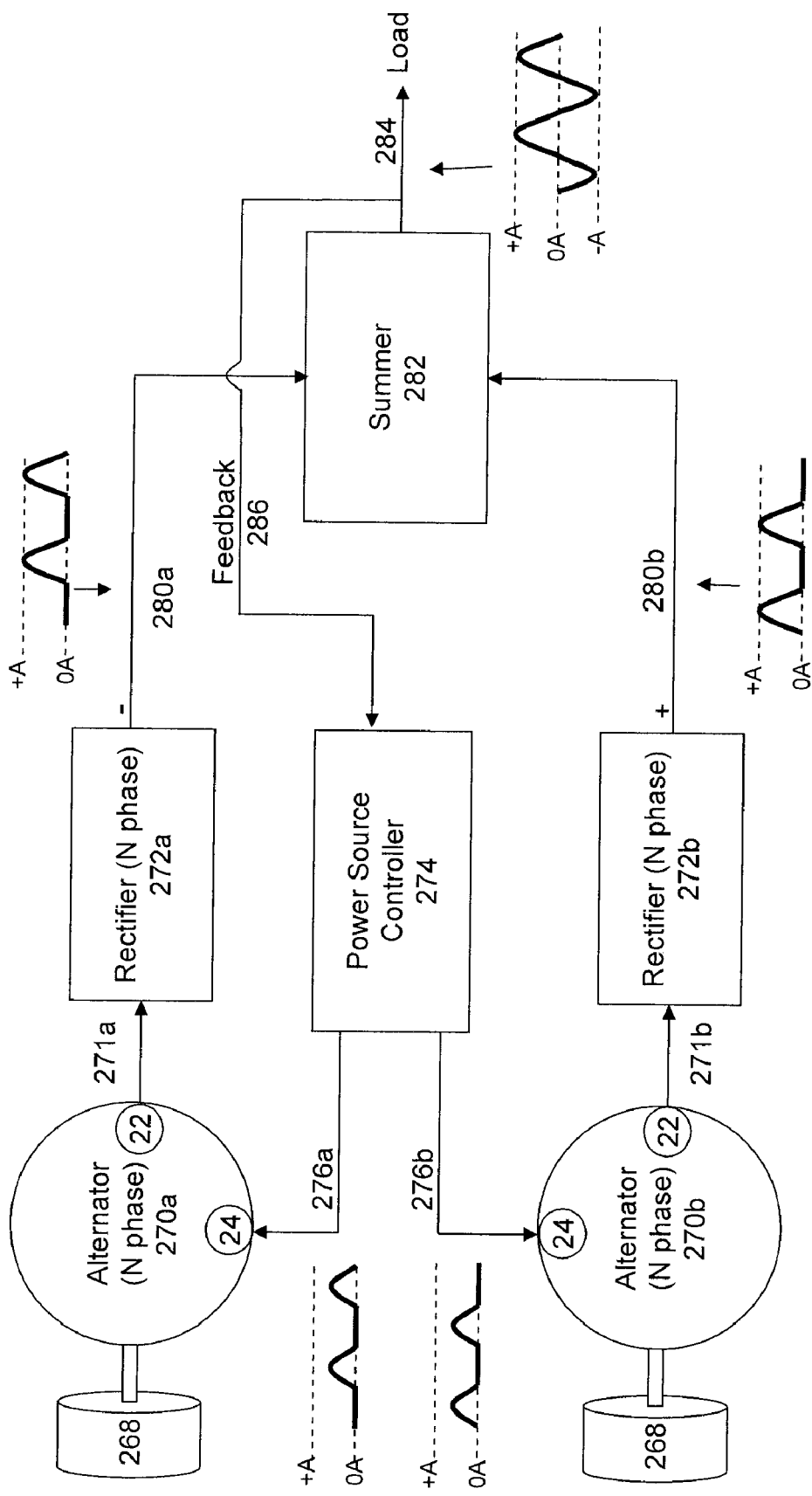
FIG. 5 is a schematic showing a system according to the present description.

Referring now to FIG. 5, wherein an alternating current power generator system utilising machines 10 (having power winding(s) 22 and control winding(s) 24) is depicted. The power generator system in this embodiment uses two variable or fixed speed alternators 270a, 270b, preferably each having the design of machine 10, each providing variable or fixed frequency N-phase currents 271a, 271b. The components of the system may be generally referred to with reference numerals having an "a" or "b" suffix when referring to aspects associated with a specific alternator 270a or 270b, and without the suffix when referring generally to such elements. A current rectifier 272a, 272b, such as a full-wave N-phase rectifier, converts the N-phase output current 271a, 271b of the respective power windings 22 into direct current outputs 280a, 280b. The rectifier 272a, 272b preferably includes filter(s), such as a high frequency filter, to remove undesired residual components. The alternators 270a, 270b are driven using the same or different prime movers 268 such as gas turbine(s), a windmill(s), water turbine(s) or any other mechanical power source(s).

Control is achieved by varying control currents 276a, 276b provided by controllers 274a, 274b to the respective control windings 24 of alternators 270a, 270b, such that the alternators 270a, 270b AC output currents (i.e. the output currents in power windings 22) vary in amplitude proportionally relative to the control input currents 276a, 276b (i.e. the control currents in control windings 24)), as described above (i.e. controllers 274a, 274b have a control function similar to supply 50 of FIG. 4). That is, as the control current in respective control windings 24 is increased, the absolute value of the alternator output AC current in the respective power windings 22 is increased in amplitude proportionally according to the principles discussed above. By varying the input control current 276 provided to respective control windings 24 in a desired pattern and at a level sufficient to saturate at least a portion of the stator corresponding to the secondary magnetic circuit 62, according to the teachings above, such as a half sinusoidal pattern (the input current pattern depicted schematically in FIG. 5), at a desired frequency, the absolute value of the amplitude of the AC output 271 from the power windings 22 of the alternators will vary according to the same general pattern and frequency. The control windings and associated control flux bus are preferably configured such that virtually any current through the control windings results in saturation of the control flux bus in the absence of power winding current (i.e. no opposing fluxes from the power winding current). Once the AC outputs 271a, 271b from the power windings 22 of the alternators 270a, 270b are rectified from AC to DC by rectifiers 272a, 272b, the DC outputs 280a, 280b provide outputs which vary proportionally and in phase with the control input signal 276a,b, such as in a half sinusoidal pattern (depicted schematically in FIG. 5) if the control input was a half sinusoidal pattern, thereby following the input control signal. High frequency filtering applied to the rectified signal will eliminate any ripple remaining in the rectified signal, leaving only the desired half sinusoidal modulated DC outputs. The two alternators 270a, 270b controlled in this arrangement each produce an output in a pattern corresponding to the control input, which can then be combined in a suitable way by a summer 282, to form a full AC wave output 284 (depicted schematically in FIG. 5), at any frequency desired (usually up to about one half of the alternator fundamental power frequency), including zero frequency (i.e. DC) if desired. The rectified output current from each machine is directly related to the input control current and as such can be made to vary in any form desired. By providing each of the control winding sets 24 of the alternators 270a, 270b with complementary wave forms, a symmetrical AC output wave form results at the combined output terminals. Providing the respective control windings 24 with input current having a wave that "looks" like a half wave rectified signal (e.g. single humps of a rectified sine wave), a similar current wave form will flow in the rectifier 272 output circuit, amplified according to the turns ratio between control and power windings. Reversing polarity of every other cycle then reconstitutes a full AC wave.

Figure 6:
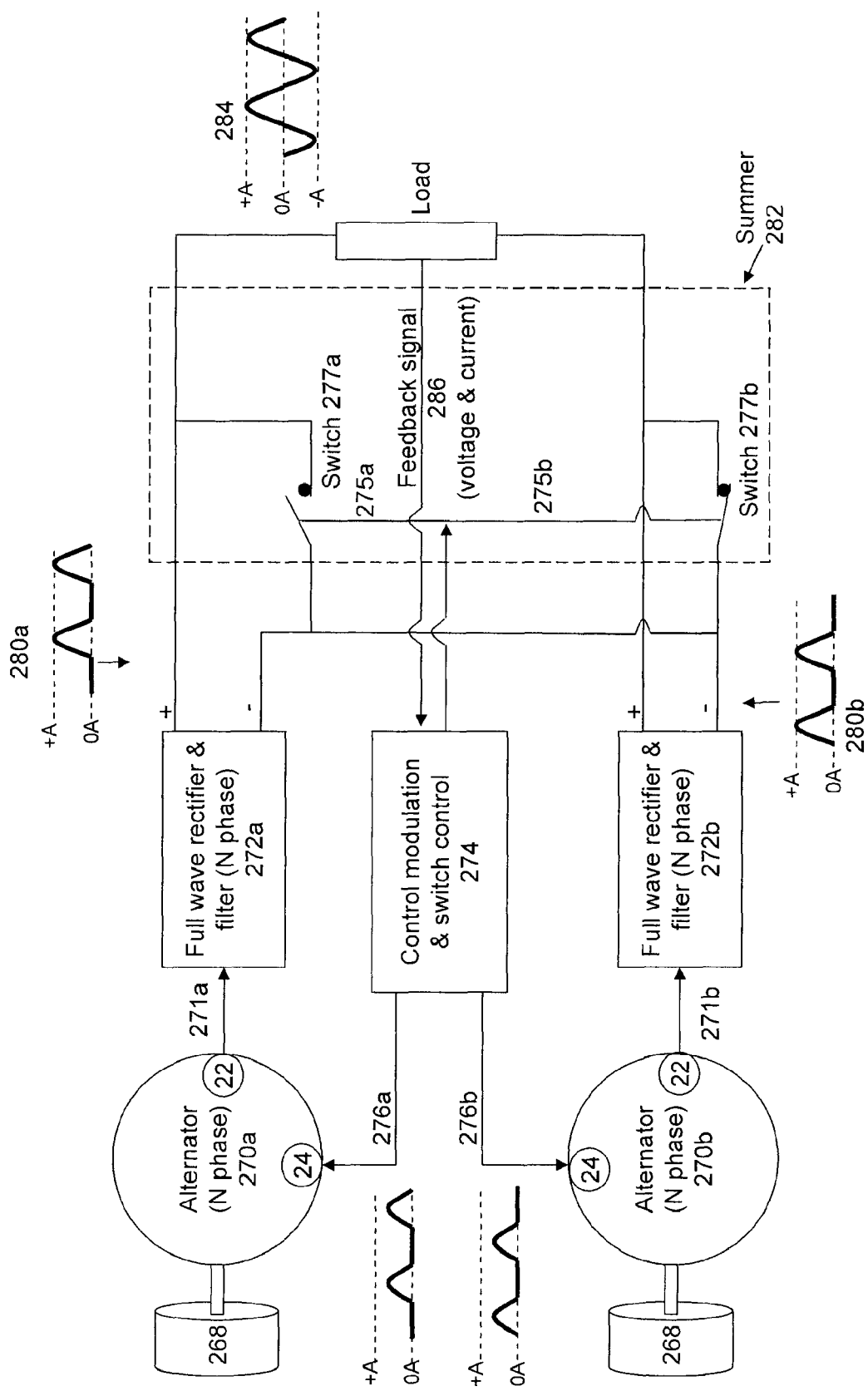
FIG. 6 is a schematic of an embodiment of the system of FIG. 5.

Referring now to FIG. 6, an example of the system of FIG. 5 is depicted in more detail. Like reference numerals denote like elements. One or more prime movers 268 rotate alternators 270a, 270b to generate n-phase current outputs 271a, 271b from the alternators. The output 271a, 271b is amplitude modulated as already described, according to the control inputs 276a, 276b and the internal characteristics of the alternators 270a, 270b, and then rectified by units 272a, 272b, and then summed 282, as will be described below, to provide a system output voltage & current 284 to a load. If half sinusoidal control inputs (for example) are provided to alternators 270a, 270b, the control inputs being out of phase with one another, and the rectified outputs of alternators 270a, 270b are connected one to each end of the load circuit and switches 277a and 277b arranged such that, when the corresponding rectifier output is zero, the switch provides a short circuit across the output of the rectifier, and thus a full sinusoidal AC current will flow in the load circuit. Preferably, the control inputs are provided such that only one of the alternators 270a, 270b produces an output current at a given time. The frequency of output current is preferably thus dependent only on the frequency of the input control current, and not on the rotational speed of the alternators 270a, 270b. As shown in FIG. 6, the control current is controlled based on the combined AC outputs (280a, 280b) which is fed back 286 to the control 274 for processing and input back into the control cycle. As mentioned, the magnitude of the AC output is related to the magnitude of the control input by the turns ratio between the control windings and power windings in alternators 270a, 270b.

Referring still FIG. 6, details of one suitable summer 282 arrangement will now be described. Summer 282 comprises two switches 277a, 277b. Switch 277a is closed when alternator 270b is provided with control current and is driving output current, for example, for the negative half cycle to the load, and switch 277b is closed when alternator 270a is being provided control current to deliver positive half cycle current to the load. The switches 277a, 277b are preferably solid state devices such as IGBT transistors or MOSFET devices, since unidirectional switches may be used to provide this circuit. The rectifiers 272a, 272b are any suitable, and preferably standard, arrangement. The output of the rectifier 272a is at or near zero when the control current for alternator 270a is at or near zero and, as such, as the switch 277a is closed it provides a current path for the current beginning to flow in the reverse direction through the load from rectifier output 272b, and also provides a shunt path for residual current that may flow from rectifier 272a. The switches 277a, 277b may be proportionally controlled during switching "on" and "off", to improve the fidelity of the generated waveform near to the zero crossing point in the waveform. When this overall modulation technique is employed, the original alternator fundamental frequency is essentially eliminated leaving only the control modulation component as a resulting output power frequency.

Figure 6A:
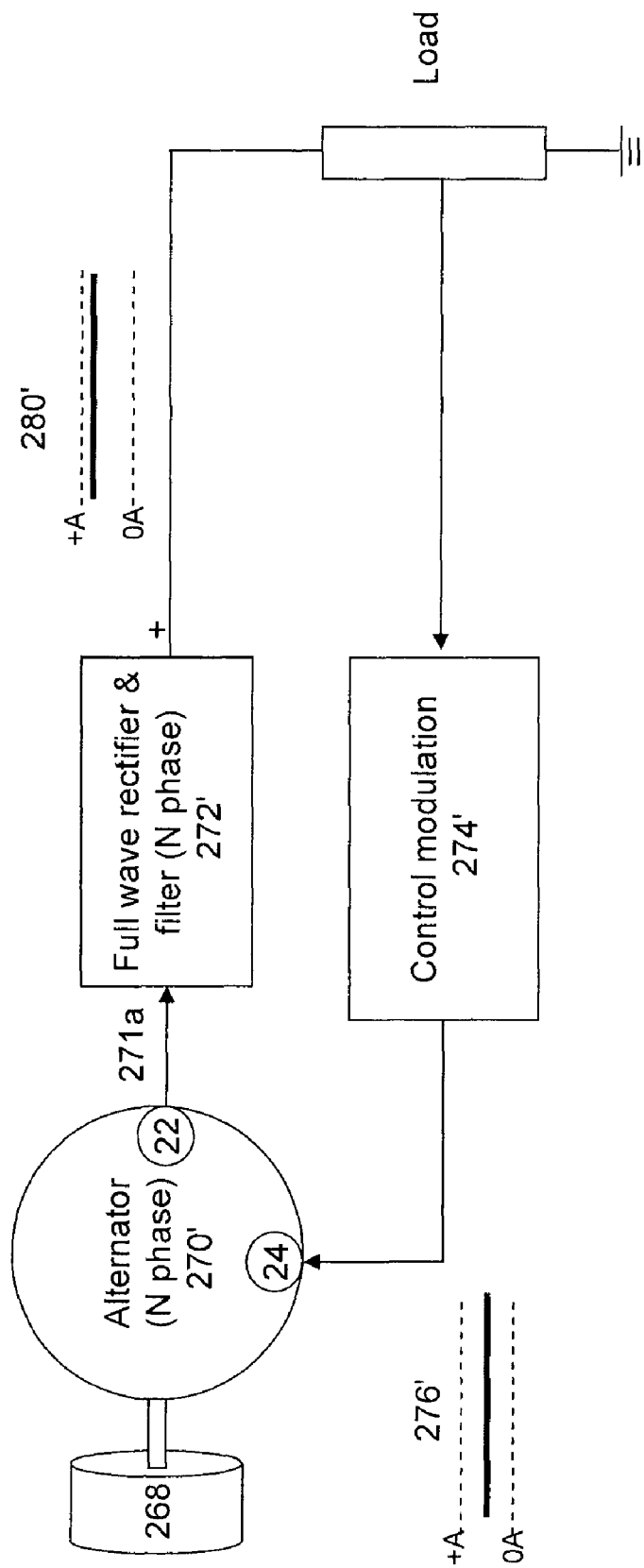
FIG. 6a is a schematic of an alternate embodiment of the FIG. 6 system.

Referring still FIG. 6, in another aspect, in order to achieve a DC output of a given polarity with this arrangement, preferably the input control current to one machine (e.g. 270a) is set to a selected DC current, while the other machine (e.g. 270*b*) is set to zero control current, and the switch across the un-used machine rectifier (e.g. switch 277*b*) is closed. The skilled reader will appreciate that the magnitude of the input control current to the "live" machine 270*a* would depend on how much output DC current is desired from the rectifier 272*a*, and depends on machine characteristics such as turns ratio, etc. Of course, if a DC output current of a single polarity was always required from the system, the system of FIG. 6 could be simplified to remove the 'unneeded' alternator and equipment, and thus a single alternator system could be provided, as shown in FIG. 6*a* (a constant control current is schematically depicted, but is not required). Referring again to FIG. 6, the polarity of DC output from the system could, on the other hand, be reversed at a moments notice if desired, simply be reversing which machine 270*a*, 270*b* was activated in conjunction with the appropriate switch. Similarly, if a square wave output current was desired, appropriate modulation (i.e. control) current and switch control signals simply need to be provided.

There are other rectification and output combining methods that allow the use of a single controllable machine to produce an arbitrary AC output waveform, including sinusoidal of any desired frequency within the limits of the system. One such example will be discussed below with respect to FIG. 8.

Figure 7:
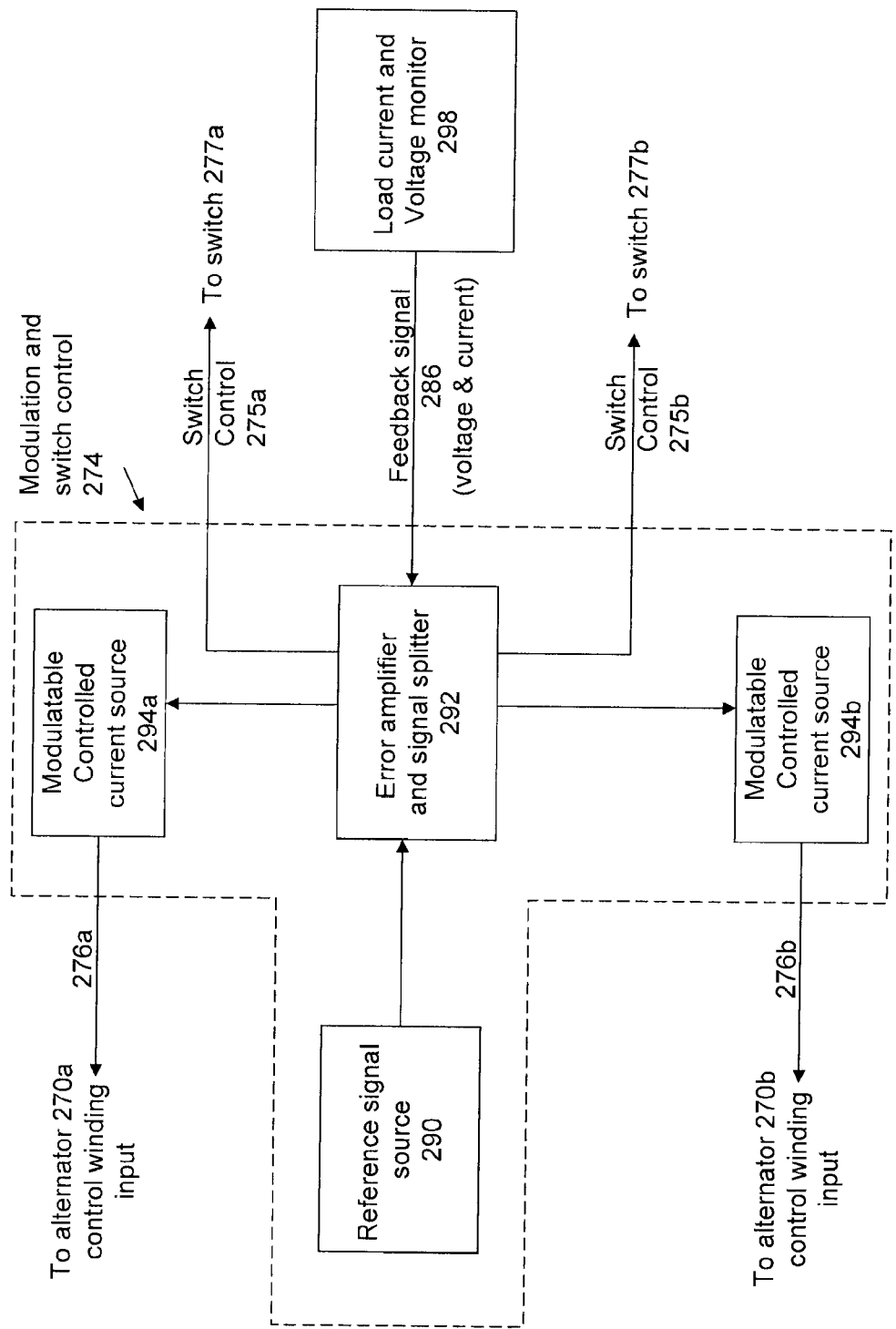
FIG. 7 is a block diagram showing an embodiment of a control current modulator of FIG. 6.

In order to obtain a high fidelity power signal from the output of the power system of FIG. 6, the system arrangement shown in FIG. 7 may optionally be used to provide modulation and switch control 274. A reference signal source 290 of, for example, a 400 Hz sine wave of a desired fixed amplitude is provided to one input of a differencing error amplifier and signal splitter 292. The other input of the differencing amplifier 292 is provided with feedback signal 286 derived by a load current and voltage monitor 298 from the output of the power system (i.e. in this example, a 400 Hz sine wave). The difference or error between the reference 290 and the output signal feedback 286 is determined. From this, a "correcting" current waveform is generated, which has been modified from the "pure" input wave in an attempt to remove the error in the output power signal, relative to the desired output (as represented by the reference 290), to thereby yield the more "pure" output waveform. This corrected waveform then becomes the basis for the control current 276, and the signal splitter 292 provides an appropriate signal to current sources 294*a* and 294*b*. Thus, in the example of FIG. 6, the corrected control current may vary from the "pure" input wave depicted schematically at 276*a*, 276*b*. The corrected modulation control current is provided as the control input current 276*a*, 276*b* to the alternators 270*a*, 270*b*. This effect causes the output power signal to be similar to the reference signal 290, within an error band based on the gain parameters of the differencing amplifier 292. In this way, any nonlinearities in the control winding 24 or rectifier systems 272*a*, 272*b* can be minimized, or preferably eliminated, including crossover distortion due to the switch action of the switches 277*a*, 277*b*. Referring again to FIG. 6, the crossover distortion due to the switching action of the switches 277*a*, 277*b* is preferably also minimised by control 275*a*, 275*b* of the rate at which the switches 277*a*, 277*b* are opened and closed, such that the rate of change of the output current, as the exchange from one rectifier system (e.g. 272*a*) providing current to the load changes over to the other rectifier system (e.g. 272*b*) providing current to the load. This crossover distortion minimization technique may be desired in situations where the output current 271*a*, 271*b* of the alternators 272*a*, 272*b*, can not be completely reduced to zero, such that the switches 277*a*, 277*b* effectively act as a shunt circuit for the remaining current. The controlled slower switching of a given switch 277*a*, 277*b*, as described above, can provide the correct rate of change of circuit output current such to match the reference signal rate of change near to the zero crossing point, which thereby minimizes or eliminates crossover distortion.

In addition to frequency control of the generated alternating current 284, it is possible to regulate the amplitude of the generated alternating current 284. A feedback control circuit is used by the modulation and switch controller 274 to compare the amplitude of the generated alternating current 284 to a fixed reference (e.g. representative of a desired amplitude), and control can be configured such that, when the generated alternating current 284 is less than a desired amplitude, a command is provided to increase the amplitude of the control current to increase saturation level and therefore amplitude of the generated alternating current 284. Likewise, when the amplitude of the generated alternating current 284 is above a desired reference amplitude (which may or may not be the same reference amplitude mentioned above), a command is similarly provided to reduce the amplitude of the control current to decrease saturation level and therefore the amplitude of the generated alternating current. The amplitude of the generated alternating current can thus be regulated. However, as mentioned, feedback control of any sort is considered optional to the present invention, and may be omitted if desired.

Figure 8:
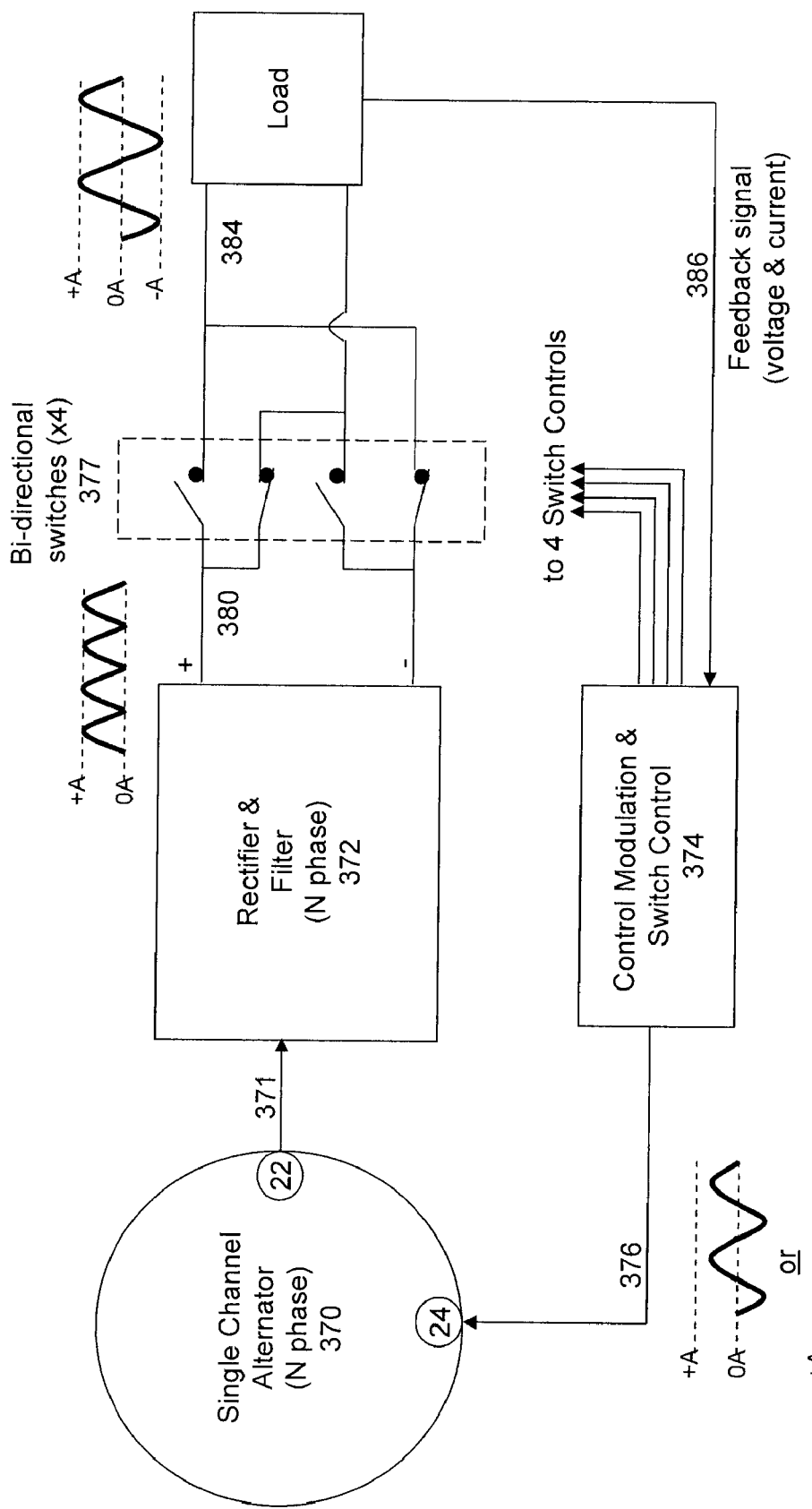
FIG. 8 is a schematic similar to FIG. 5, showing another embodiment.

FIG. 8 shows an alternate arrangement, in which a single modulated alternator 370 and full bridge of 4 bi-directional switches is provided to provide a symmetrical AC output, as will now be described. In this arrangement, the modulation signal 376 supplied by a modulation unit 374 to the control winding 24 can be either an AC signal similar in shape and frequency to the desired final output signal, or a full wave rectified version of what is desired as a final output signal (e.g. similar in shape & frequency), as depicted schematically in FIG. 8. As the current increases during the first half cycle of the control input 376 wave (e.g. a sine wave) increases from zero and then decreases back to zero, the output current of the rectifier 380 output will similarly increase then decrease. Once this first half cycle of the control input 376 is completed (i.e. the control current wave has returned to zero input current), the position of the switches 377 on the output 380 of the rectifier 372 are reversed, causing the current into the load to be reversed. Then as the control current begins to increase in the negative direction below zero, where AC control current is provided (or to increase again where full wave rectified control current is provided), the output current begins to increase in the opposite direction in the load, since the switch positions are reversed, and then subsequently decrease back to zero thereby completing the other half of the AC sine wave.

Figure 9:
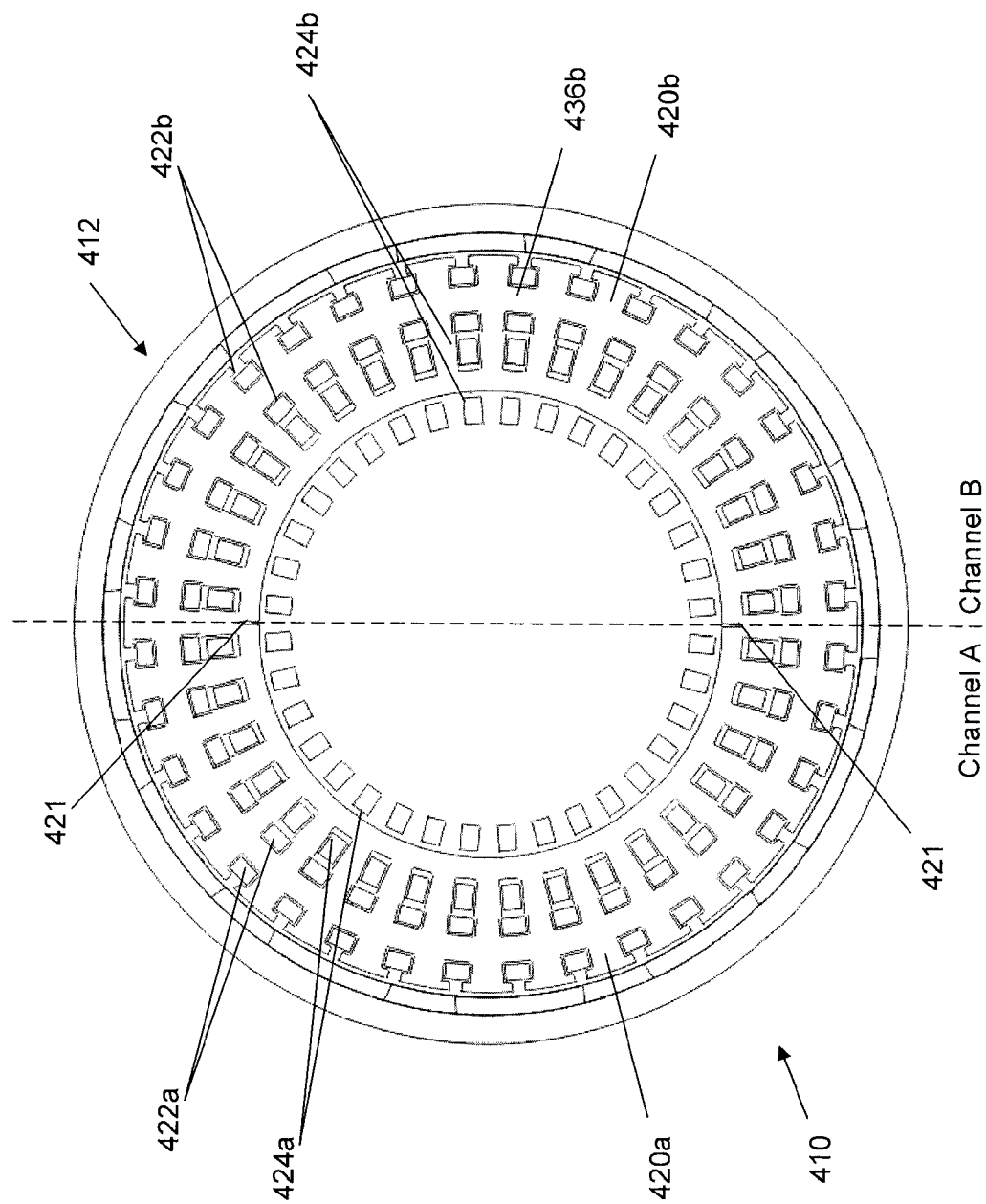
FIG. 9 is a cross-section, similar to FIG. 1, of another configuration for alternator.

Referring to FIG. 9, in another embodiment, a N-phase, "dual channel" machine, according to the general principles described in applicant's U.S. Pat. No. 6,965,183 as modified in accordance with the present teachings, may be used, and will now be described in more detail. The dual channel machine 410 has two (in this embodiment) circumferentially distributed distinct and fully independent (i.e. electromagnetically separate) N-phase sets of primary windings 422 and associated control windings 424 provided in stator 420. Stator 420 is divided into two sectors or halves 420*a*, 420*b*, the halves being delineated in FIG. 9 by the stippled line bisecting the stator, and the separate winding sets (e.g. 422*a*/424*a* and 422*b*/424*b*) of each channel are confined to these separate sectors or halves 420*a*, 420*b* of the machine, which thereby provides a "two-in-one" or 2-channel machine 410. Each of the two sets of N-phase windings is independently controllable and thus have the effect similar to as if two distinct machines were provided (i.e. as in FIG. 6). As discussed in applicant's U.S. Pat. No. 6,965,183, this multi-channel architecture permits a plurality of independently controllable alternators to exist within the same stator, and which may either be operated conjunctively or independently as desired. This feature thus permits more than one functional "machine" to exist within the same stator structure.

The stator of FIG. 9 preferably includes means for impeding cross-talk between the tertiary magnetic circuits of channels A and B, such as is described in applicant's co-pending application Ser. No. 11/419,238, entitled "Magnetic Control Circuit Separation Slit", filed May 19, 2006. As described in that application, the presence of a cross-talk reduction feature, such a stator slit 421, acts to substantially contain the tertiary magnetic within the channel. As such, the tertiary magnetic flux preferably travels along the entire length of the control flux bus 432 to the channel boundary, where the presence of the cross-talk reduction slit 421 redirects the flux up to power flux bus 436, where it then travels back along entire length of the power flux bus 436 (this flux is not present, and therefore not depicted, in the single channel embodiment of FIG. 2), until the path joins up again with the beginning of the tertiary path, in the vicinity of another cross-talk reduction slit 421.

Figure 10:
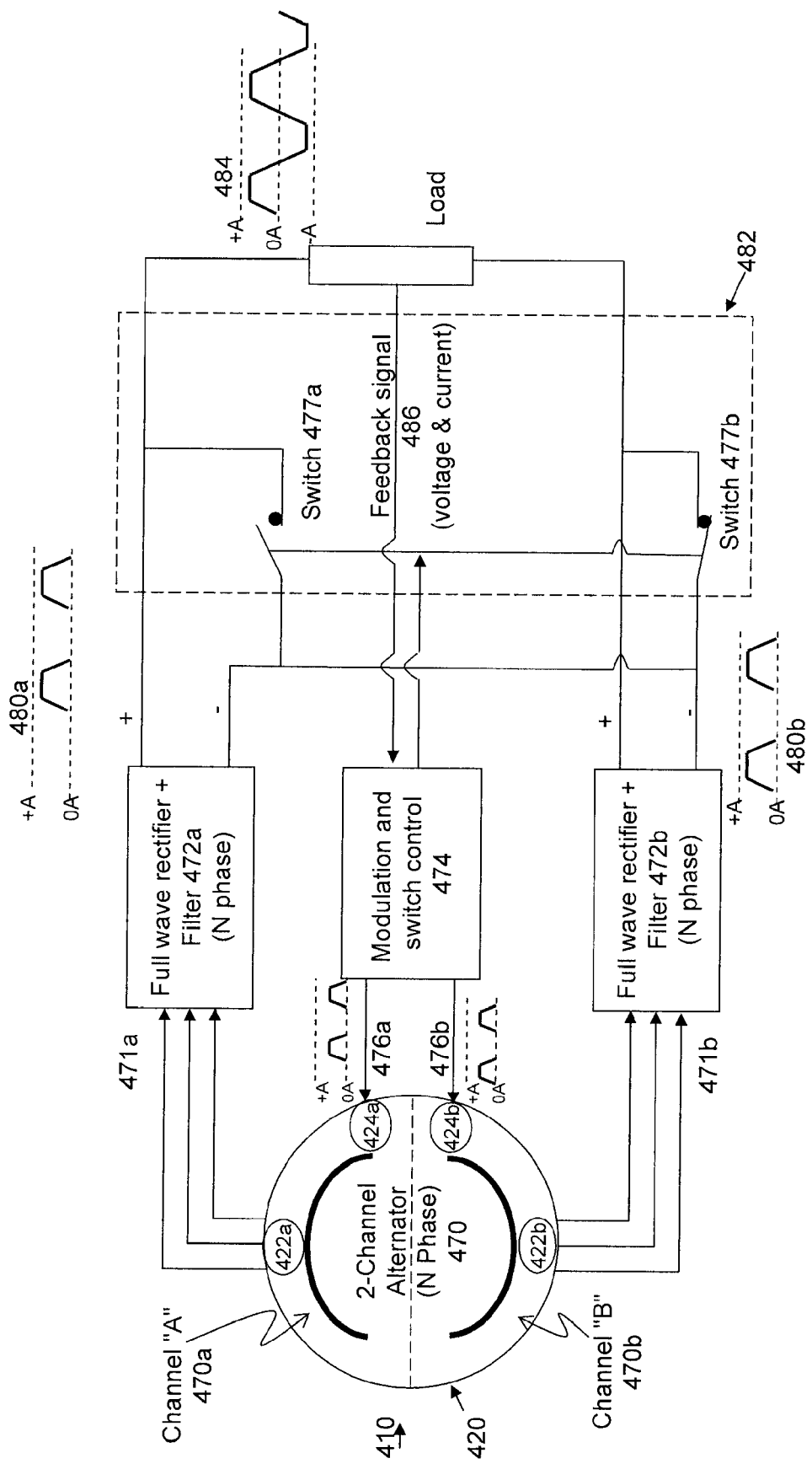
FIG. 10 is a schematic similar to FIGS. 5 and 8 showing another embodiment.
Figure 11:
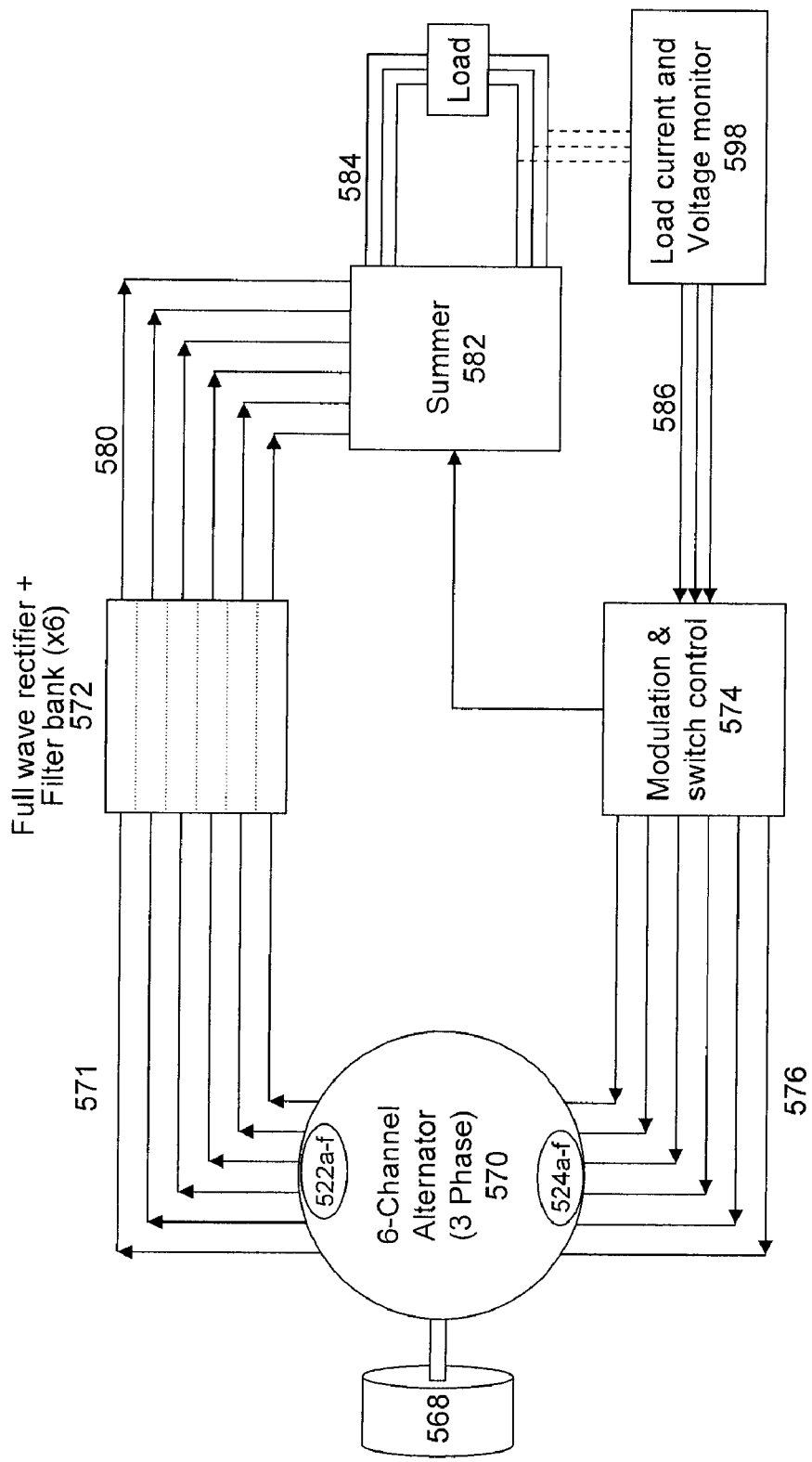
FIG. 11 is a schematic showing another embodiment.

FIG. 10 illustrates an alternating current power generator system using a dual channel machine 410 to provide alternator 470. In alternator 470, preferably half 420a of the machine 410 provides functionality comparable to alternator 270a of FIG. 5, while the other half 420b of the machine 410 provides the functionality of alternator 270b of FIG. 5. A power source controller 474 includes current sources adapted to provide an appropriate control current 476a, 476b to control the alternator output currents 470a, 470b. As described above, by varying control currents 476a, 476b alternately with a period corresponding to the desired output frequency, each consisting of one half of the desired output waveform (in this case, a trapezoidal wave) during one half of the desired total period corresponding to the desired output frequency, channels A and B of alternator 470 can be modulation-controlled in a manner as described above.

The frequency of the generated alternating current 484 is controlled by the frequency of the control currents 476a, 476b and the frequency at which the AC component is restored. Additionally, the amplitude of the generated alternating current 484 is controlled by the amplitude of the control currents 476a, 476b. Accordingly, feedback 486 is optionally provided to the modulation and switch controller 474 so that the amplitude of the control current can be automatically adjusted to compensate for fluctuations of the generated alternating current or voltage 484.

Therefore it can be seen that output frequency is controlled and can be set to fixed desired value or may be varied in time, all independently of the mechanical speed of the alternator(s). For example, it is thus possible to drive a power generator directly from a variable speed gas turbine and yet provide a constant 60 Hz alternating current output, by providing a suitable control input(s). In another example, 400 Hz alternating current used in aeronautics applications could also be provided, again by providing a suitable control input(s). Therefore, the speed of the alternator(s) is no longer critical to output frequency. In arrangements where more than one alternator is employed, such as in FIGS. 5 and 6 for example, the speed of alternators 270a, 270b need not necessarily be equal. In all arrangements, the speed of the alternator(s) need only be above a given minimum speed required for production of a minimum output voltage and/or frequency. The minimum output voltage of the alternator at maximum control current is defined by machine parameters such as maximum flux rate of change and the length of the windings looped by the flux from the rotor. The machine speed or output voltage is preferably sufficient to at least provide a DC output from the rectifiers to be able to reproduce the peak voltage required in the output waveform. The machine speed is preferably any practical speed above this minimum speed. Preferably, to maximize the weight and size benefits offered by the present approach, alternator(s) speed will be as high as possible, to minimize the alternator(s) size required to generate the desired output voltage & current.

Figure 12:
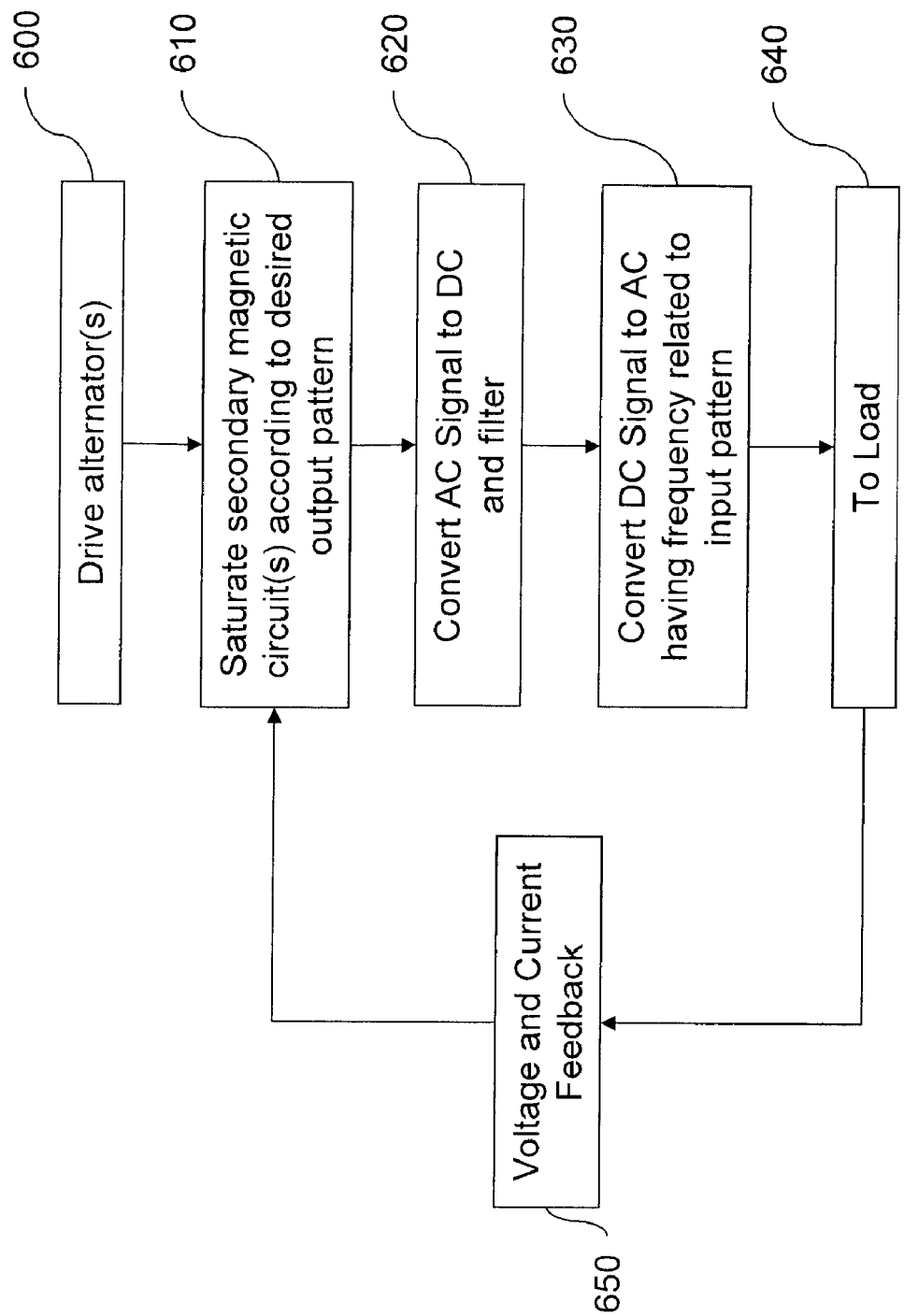
FIG. 12 is a flowchart of the steps of a method according to the present techniques.

Referring to FIG. 12, a method to provide a modulated AC power output at a desired frequency is depicted. One or more alternators are driven (600) by one or more prime movers, to induce electricity in the power windings 22. Saturation in the alternator secondary magnetic circuit is selectively controlled (610) according to a desired output pattern, thereby affecting the alternator output as described above. The alternator output is converted (620) from AC to DC (i.e. the absolute value of the alternator output is acquired), and filtering is also optionally performed. The DC signal is then restored (630) to AC output signal having a frequency corresponding to the input pattern. The output AC signal may then be provided (640) to a suitable load. Feedback monitoring (650) can be used help improve output signal fidelity or provide other monitoring or control function, as desired.

The present approach permits alternator output to be varied from zero frequency (i.e. DC) up to frequencies that are only limited by the speed and number of magnets used in the rotor. Modulation can also be set to any amplitude between zero and the maximum alternator output, which is limited only by the power of the prime mover rotating the alternator. The control-to-power winding turns ratio is preferably more than 1:1 to achieve an amplification effect between the control input and the alternator output. However, generally speaking, a lower inductance (and thus turns ratio) in the control windings is desired for AC excitation reasons, but a higher turns ratio results in higher amplification which is also desirable, and so optimization is usually required. Affecting the trade-off is the fact that the power winding voltages can be very high, where the control windings at high current can still be at a very low voltage, if the frequency of the alternator output is significantly larger than the modulation frequency.

Existing 60 Hz turbine generator sets normally run at 3600 RPM or slower, in order to obtain their 60 Hz output frequency. This requirement leads to very large machines for useful power generation, and in general the size and weight of the machine is inversely proportional to its operating speed for a given power rating. Large vehicles such as trains and ships, as well as oil platforms or other outposts requiring standard electrical power, have a limited choice as to power supply, such as low speed generators (high power gear box, plus large 3600 or 1800 RPM generator) or expensive solid state power electronics and heavy filtering systems, to synthesize the low frequency power. The present approach permits the provision of a large-output power supply which is only a fraction of the weight and cost of these prior art systems. The present invention therefore offers a lightweight, simple and versatile solution to all these, and other, problems. The alternator(s) may be driven by any suitable primer-mover (s), though a prime-mover with high tangential speed (i.e. relative speed between alternator stator and rotor) will minimize the size of the present system, and thereby take advantage of the space, weight, etc. savings offered by the present approach. The present system is particularly well suited to be driven by a main shaft of a gas turbine engine, and the size & weight savings make it well-suited for use with aero-engines, such as a turbofan, turboshaft and turboprop gas turbine engines.

The present invention may be used to provide different alternating current shapes such as a sinusoidal, trapezoidal, triangular sawtooth, square wave or any other desired shape or pattern. The shape/pattern need not be regular nor fixed. The shape of the generated alternating current 284 is adjusted by providing the appropriate shape of control current 276a, 276b. The design of machine 10 allows for varying degrees of saturation, as opposed to an on/off scheme. The generated alternating current 284 can thus be modulated as desired. It should however be taken into consideration that the electric machine 10 may have a sufficient non-linear behaviour, depending on configuration, that the shape of the control current 276a, 276b must compensate to achieve the desired result. Additionally, as mentioned the generated current 284 is not necessarily a periodic alternating current but could also be any time varying current, or as mentioned, need not vary at all (i.e. can be DC).

Figure 14:
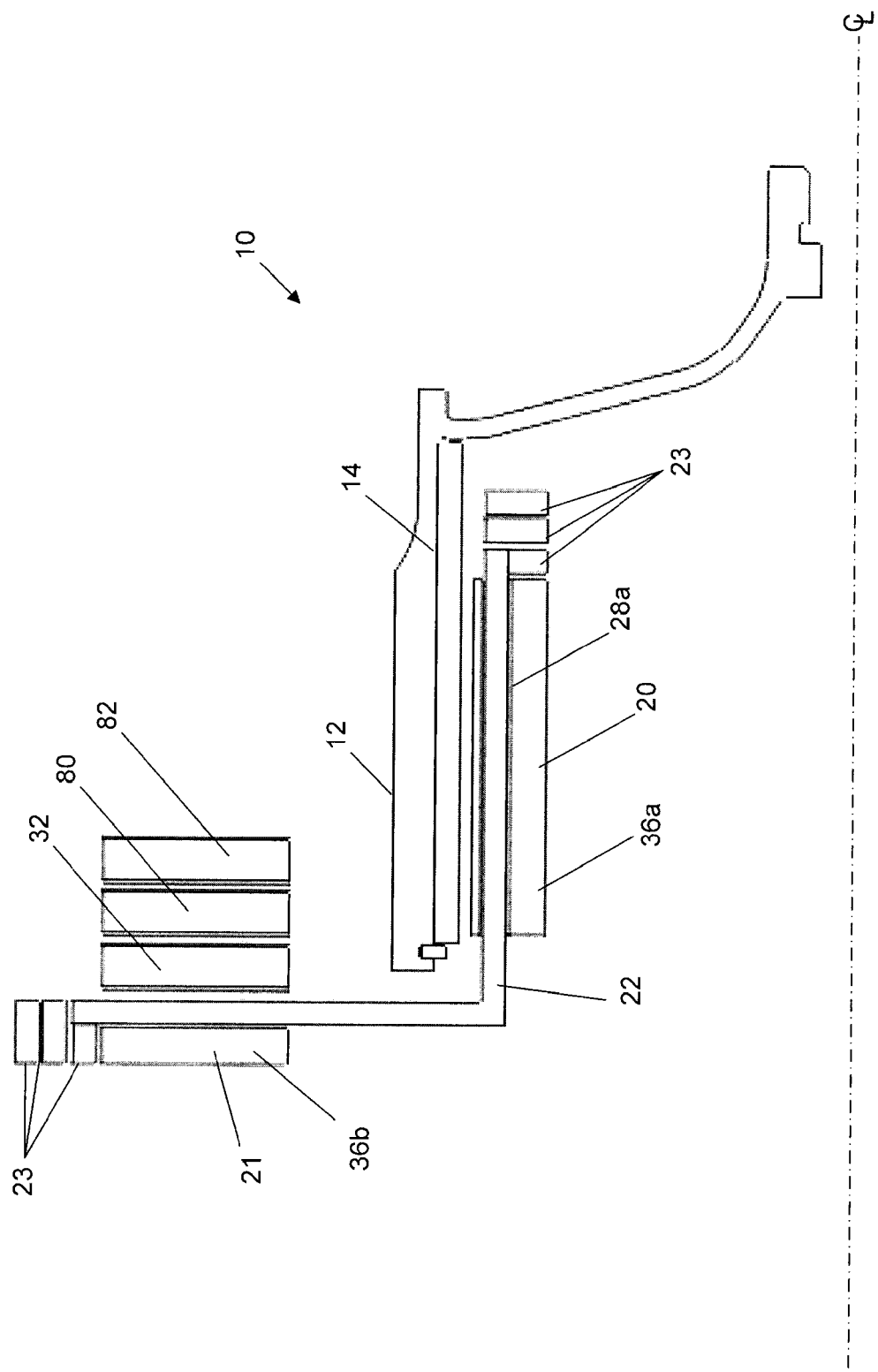
FIG. 14 depicts, in side cross-section, a portion of another alternator configuration.

In another embodiment, rather than rely on a control winding 24 and controlled current source 50 for saturation control in one or more alternators, saturation may instead be provided by permanent magnet(s) brought into close proximity to the control flux bus by an appropriate control and actuation system, which may be mechanical, electrical, electronic or otherwise, or combinations thereof. For example, referring to FIG. 14, a saturation assembly comprising one or more suitable permanent magnets 80 brought into close proximity to the secondary magnetic circuit 62 by an appropriate control and actuation system (not shown), which may be mechanical, electrical, electronic or otherwise, or combinations thereof. For example, permanent magnets 80 are mounted on a support 82, which is controllably moveable, such as through rotation, reciprocation, vibration or other movement, so as to permit the magnets to periodically vary a saturation level of at least a portion of the secondary magnetic circuit, to appropriately control power winding 22 as described above. The frequency of saturation is adjusted through control of the speed and movement of the moving magnets 80. This permanent magnetic saturation assembly eliminates the need for an electromagnetic assembly with control winding 24 and its associated circuitry. Any other suitable magnetic or electromagnetic saturation techniques may be employed in order to achieve the saturation control effect described herein.

Although single phase system outputs have thus far been described above for simplicity, the system output can have any desired number of phases, provided that the required number and configuration of alternators are provided to do so. For example, referring to FIG. 11, a turbine 568 drives a six-channel alternator 570 (having channels "a" to "f", not shown) to provide a 3-phase power supply system including six independent power winding sets 522a-f, and respective control windings 524a-f, providing dual-channel 3-phase output 584 to a load. Thus provided is a 3-phase source having a variable frequency, from zero (i.e. DC) to maximum frequency, depending on the control input provided, which has many potential applications requiring high power capability, and which offers cost, size and complexity advantages over solid state devices, especially at higher power levels.

For clarity, the skilled reader will understand that, in general, saturation of a magnetic material is defined as the region in the operating range of flux density in the material where a further increase in magnetizing force (H) produces no significant change in flux density (B) above what would be observed in a circuit comprised only of air. The skilled reader will also appreciate that operating a magnetic material at a flux density 50% below the saturation flux density is not considered to be 50% saturated, but rather is understood to be not saturated at all (i.e. unsaturated).

The above description is meant to be exemplary only, and one skilled in the art will recognize that changes may be made to the embodiments described without department from the scope of the invention disclosed. For example, the number of phases in the alternators could be varied and could be to any number. The alternators may be single phase or multi-phase, single or multi-channel. The windings may have single or multiple turns per slot, the number of turns of a winding not necessarily has to be a whole number. The number of power windings does not necessarily have to equal the number of control windings, and one or more windings may perhaps be present in a slot. The windings may be any conductor(s) (i.e. single conductor, more than one wire, insulated, laminated, Litz etc.) or may be superconductors. In multiphase alternators, there may be delta or Y-connected windings in accordance with suitable techniques. There need not be an air gap between the power and control windings, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and the ones described above need not be used at all, or throughout the apparatus. Also, the magnetic circuits described can be arranged in the stator (and/or rotor) in any suitable manner. Likewise, the stator and rotor may also have any suitable configuration. For example, the stator need not be slotted, as any suitable stator configuration may be used. Any suitable saturation technique may be used. Although a DC source is preferred for control of saturation in some embodiments described above, an AC source may also be used when suitable to achieve desired results. The control input need not be regular, periodic or have constant frequency or amplitude, and may have complex frequency(ies), such as an audio signal, or may have zero frequency (DC). Rectifiers need not be conventional, but may be or use any suitable means of acquiring the absolute value of an AC signal. The inverters, summers, etc. need not be conventional, but may be or use any suitable means of providing an AC signal from the provided inputs. The rectifiers, summers, inverters, etc. described are exemplary only, and any suitable means of converting AC to DC, or vice versa, may be used without departing from the invention taught herein. Although only a portion of the secondary magnetic circuit is saturated in the above embodiments, the entire secondary magnetic circuit may saturated if desired, provided that the rotor magnetic circuit is not saturated. Still other modifications which fall within the scope of the present invention will be apparent to those skilled in the art, in light of a review of this disclosure, and such modifications are intended to fall within the appended claims.

The invention claimed is:

1. An apparatus comprising:
    at least one alternator drivingly connected to a prime mover to produce an alternator alternating current, the alternator having a rotor and a stator assembly having at least one stator winding for providing said alternator alternating current, the stator winding having at least a pair of legs serially connected with one another, the legs spaced apart circumferentially from one another relative to the stator assembly, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least a pair secondary magnetic circuits for conducting magnetic flux, one of said secondary magnetic circuits encircling a second portion of one of said legs of the stator winding and the other one of said secondary magnetic circuits encircling a second portion of the other of said legs of the stator winding, the secondary magnetic circuits being remote from the rotor magnetic circuits, the secondary magnetic circuits having a saturation apparatus including at least one control winding wound around at least a portion of the secondary magnetic circuits, said at least a portion of the secondary magnetic circuits being remote from the rotor magnetic circuits, the at least one control winding adapted to magnetically saturate said portion of the secondary magnetic circuits when a saturation threshold current passes through the at least one control winding, wherein one of the secondary magnetic circuits has its control winding wound in a same direction as the second portion of the stator winding leg associated therewith, and wherein the other one of the secondary magnetic circuits has its control winding wound in an opposite direction relative to the second portion of the stator winding leg associated therewith;

a controlled current source for providing to the at least one control winding a variable amplitude current having a selected frequency and a maximum amplitude of at least said saturation threshold current;

AC-to-DC conversion circuitry connected to the stator winding and adapted to convert the alternator alternating current into direct current; and DC-to-AC conversion circuitry connected to the AC-to-DC conversion circuitry and adapted to convert the direct current into an alternating current output having an output frequency proportional to the selected frequency.

2. The apparatus as claimed in claim 1, wherein the current provided to the at least one control winding is direct current varying in amplitude according to said desired frequency.

3. The apparatus as claimed in claim 2, wherein the amplitude varies in a half-sinusoidal manner.

4. The apparatus as claimed in claim 1, wherein the at least one control winding has a multiple turns ratio relative to said second portion of the respective legs of the stator winding.

5. The apparatus as claimed in claim 1, wherein the stator includes a plurality of peripheral slots, and wherein said first portions of the legs of the stator winding are disposed within different said slots.

6. The apparatus as claimed in claim 1, wherein the selected frequency is independent of a rotational speed of the alternator.

7. The apparatus as claimed in claim 1, wherein the prime mover drives the alternator at a variable speed, and wherein the selected frequency is substantially fixed.

8. The apparatus as claimed in claim 1, wherein the selected frequency is lower than a raw output frequency of the alternator.

9. The apparatus as claimed in claim 1, wherein the selected frequency is a complex frequency.

10. The apparatus as claimed in claim 1, wherein the output frequency is substantially equal to the selected frequency.

11. The apparatus as claimed in claim 1, wherein the output frequency is substantially one-half of the selected frequency.

12. The apparatus as claimed in claim 1, further comprising a feedback monitor circuit adapted to monitor said alternating current output, the monitor communicating with at least one of the controlled current source and the DC-to-AC conversion circuitry.

13. The apparatus as claimed in claim 1, wherein the stator assembly comprises a first stator defining the rotor magnetic circuits and a second stator defining the secondary magnetic circuits.

14. The apparatus as claimed in claim 1, wherein the DC-to-AC conversion circuitry includes a switching apparatus driven at the selected frequency.

15. The apparatus as claimed in claim 1, wherein said at least one alternator comprises at least two said alternators each having a said controlled current source and a said AC-to-DC conversion circuitry, and wherein the DC-to-AC conversion circuitry sums the direct currents received from the AC-to-DC conversion circuitry associated with each alternator to provide said alternating current output.

16. The apparatus as claimed in claim 15, wherein the alternators are driven by a common drive shaft.

17. The apparatus as claimed in claim 16, wherein the alternators have a common rotor and the respective stators are provided in non-overlapping sectors of a common stator body.

18. The apparatus as claimed in claim 16, wherein the alternators are driven by the same prime mover.

19. The apparatus as defined in claim 15, wherein the alternators are driven by different drive shafts.

20. The apparatus as defined in claim 5, wherein the at least one control winding comprises a plurality of control windings provided in a series-parallel arrangement, wherein the control windings of a plurality of slots are connected in series, and wherein a plurality of said series-connected windings are connected in parallel with one another to the current source.

21. The apparatus as claimed in claim 1, wherein each secondary magnetic circuit circulates only one leg of the stator winding.

22. An apparatus comprising:

an alternator having a rotor, a stator assembly and a saturation apparatus, the stator assembly having at least one stator winding, the winding having at least a pair of legs serially connected with one another, the legs spaced apart circumferentially from one another relative to the stator, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least two secondary magnetic circuits for conducting magnetic flux, one of the secondary magnetic circuits encircling a second portion of one of said legs of the stator winding and another one of the secondary magnetic circuits encircling a second portion of the other of said legs of the stator winding, the secondary magnetic circuits being remote from the rotor magnetic circuits, the saturation apparatus adapted to magnetically saturate at least a portion of each secondary magnetic circuit, said at least a portion of each secondary magnetic circuit being remote from the rotor magnetic circuits, the saturation apparatus adapted to magnetically saturate one of the secondary magnetic circuits in the same direction as magnetic flux circulating that secondary magnetic circuit while magnetically saturating the other one of secondary magnetic circuits in the direction opposite to magnetic flux circulating that secondary magnetic circuit; and a rectifier arranged to convert alternating current from the stator winding into direct current.

23. The apparatus as claimed in claim 22, wherein the saturation apparatus is adapted to magnetically saturate said at least a portion of each secondary magnetic circuit at a substantially constant saturation level.

24. An apparatus for a generating alternating current comprising:
  at least one alternator having a stator with at least one stator winding, the stator defining at least two rotor magnetic circuits and at least two secondary magnetic circuits separate from the rotor and the rotor magnetic circuits, the stator winding having first portions thereof encircled only by the rotor magnetic circuits and second portions thereof encircled only by the secondary magnetic circuits;
  means for magnetically saturating at least a portion of respective pairs of secondary magnetic circuits in opposite relative directions to thereby regulate alternator output while leaving the rotor magnetic circuits un-saturated;
  a control apparatus adapted to control said means to selectively control a saturation level according to a selected pattern;
  a rectifier to convert alternating current from the stator winding into a direct current; and
  an inverter for converting direct current from the rectifier into alternating current output having an output pattern proportional to said selected pattern.

25. The apparatus as defined in claim 24, further comprising:
  means for monitoring at least one of a deviation of an amplitude and a deviation of a frequency of said alternating current output relative to a reference signal; and
  means for varying operation of the control apparatus to reduce said deviation.

26. A method for providing alternating current using an alternator connected to a load system, the alternator having a rotor and a stator assembly with at least one stator winding, the stator winding having at least a pair of serially-connected legs spaced apart circumferentially from one another relative to the stator assembly, the legs each having respective first and second portions, the method comprising:
  rotating the rotor relative to stator assembly to circulate rotor magnetic flux through the stator along respective first magnetic paths around each of said first portions said legs of the stator winding to induce an alternating current flow in the stator winding, said induced current in the stator winding inducing a secondary magnetic flux flow in the stator assembly in respective second magnetic paths around each of said second portions of said legs of the stator winding, the second magnetic paths defined wholly within the stator assembly and separately from the first magnetic path;
  magnetically saturating and de-saturating at a desired frequency at least two portions of the stator assembly remote from the first magnetic path, said stator assembly portions comprising at least a portion of a corresponding one of said second magnetic paths and thereby conducting a said secondary magnetic flux flow therethrough, wherein one of said at least two stator assembly portions is instantaneously saturated in a same direction as secondary magnetic flux flow therethrough while the other one of said stator assembly portions is instantaneously saturated in an direction opposite to secondary magnetic flux flow therethrough;
  rectifying the induced alternating current into direct current, the direct current having a cyclical component with a frequency proportional to said desired frequency; and
  changing the direct current into an alternating current output having a frequency proportional to said desired frequency.

27. The method as defined in claim 26, wherein a second alternator is connected in parallel with said alternator, and wherein the rotating, magnetically saturating and de-saturating and rectifying are applied to both alternators, and wherein the changing includes summing said direct currents obtained from each alternator.

28. The method as defined in claim 27, wherein the magnetically saturating and de-saturating the alternators is performed so that the direct current obtained from one alternator provides a half-cycle portion of the alternating current output and the direct current obtained from the other alternator provides a different a half-cycle portion of the alternating current output.

29. The method as defined in claim 28, wherein one half-cycle portion is a positive current half-cycle portion and one half-cycle portion is a negative current half-cycle portion.

30. The method as defined in claim 26, further comprising determining an error between the alternating current output and a reference signal, and modifying at least one of a magnetic saturation amplitude and said desired frequency to reduce said error.

* * * * *